US012606952B2

(12) United States Patent
Yoshida et al.

(10) Patent No.: US 12,606,952 B2
(45) Date of Patent: Apr. 21, 2026

(54) METHOD FOR PRODUCING MODIFIED CELLULOSE FIBER, AND MODIFIED CELLULOSE FIBER

(71) Applicant: KAO CORPORATION, Tokyo (JP)

(72) Inventors: Yutaka Yoshida, Wakayama (JP); Shotaro Shibata, Wakayama (JP); Haruka Nakagawa, Wakayama (JP); Yoshiaki Kumamoto, Wakayama (JP); Norihiro Ito, Wakayama (JP); Yusaku Asai, Wakayama (JP)

(73) Assignee: KAO CORPORATION, Tokyo (JP)

(*) Notice: Subject to any disclaimer, the term of this patent is extended or adjusted under 35 U.S.C. 154(b) by 1025 days.

(21) Appl. No.: 17/051,065

(22) PCT Filed: Jun. 11, 2019

(86) PCT No.: PCT/JP2019/023096

§ 371 (c)(1),
(2) Date: Oct. 27, 2020

(87) PCT Pub. No.: WO2019/240128

PCT Pub. Date: Dec. 19, 2019

(65) Prior Publication Data

US 2021/0230795 A1 Jul. 29, 2021

(30) Foreign Application Priority Data

Jun. 12, 2018 (JP) ................................ 2018-112238
Jun. 12, 2018 (JP) ................................ 2018-112239

(51) Int. Cl.

*D06M 13/11* (2006.01)
*C08K 7/02* (2006.01)
*C08L 1/02* (2006.01)
*D06M 13/08* (2006.01)

(52) U.S. Cl.

CPC ............... *D06M 13/11* (2013.01); *C08K 7/02* (2013.01); *C08L 1/02* (2013.01); *D06M 13/08* (2013.01)

(58) Field of Classification Search

CPC ......... D06M 13/11; D06M 13/08; C08K 7/02; C08L 1/02
USPC ........................................................ 8/116.1
See application file for complete search history.

(56) References Cited

U.S. PATENT DOCUMENTS

| | | | | |
|---|---|---|---|---|
| 5,120,838 | A | 6/1992 | Just et al. | |
| 5,140,099 | A | 8/1992 | Bostrom et al. | |
| 6,248,880 | B1 | 6/2001 | Karlson | |
| 10,738,169 | B2 * | 8/2020 | Yoshida | C08L 101/00 |
| 2007/0059267 | A1 | 3/2007 | Boström et al. | |
| 2008/0242852 | A1 | 10/2008 | Kim et al. | |
| 2013/0236512 | A1 | 9/2013 | Adden et al. | |
| 2014/0073773 | A1 * | 3/2014 | Miyoshi | C08B 1/06 536/56 |
| 2015/0144032 | A1 | 5/2015 | Brush et al. | |
| 2018/0244806 | A1 | 8/2018 | Yoshida et al. | |
| 2019/0010253 | A1 | 1/2019 | Yoshida et al. | |
| 2019/0023859 | A1 | 1/2019 | Yoshida et al. | |
| 2019/0169314 | A1 | 6/2019 | Yoshida et al. | |
| 2019/0185587 | A1 | 6/2019 | Yoshida et al. | |

FOREIGN PATENT DOCUMENTS

| | | | | |
|---|---|---|---|---|
| CN | 1318071 A | | 10/2001 | |
| CN | 1894282 A | | 1/2007 | |
| CN | 101798352 A | | 8/2010 | |
| JP | 3-2201 A | | 1/1991 | |
| JP | 3-223301 A | | 10/1991 | |
| JP | 6-9702 A | | 1/1994 | |
| JP | 8-169901 A | | 7/1996 | |
| JP | 2008-74962 A | | 4/2008 | |
| JP | 2009-522394 A | | 6/2009 | |
| JP | 2013-539815 A | | 10/2013 | |
| JP | 2016-540104 A | | 12/2016 | |
| JP | 2017-53077 A | | 3/2017 | |
| JP | 2017053077 | * | 3/2017 | C08L 9/06 |
| JP | 2018-145334 A | | 9/2018 | |
| WO | WO 2017/043452 | * | 3/2017 | C08J 5/04 |

OTHER PUBLICATIONS

Chinese Office Action and Search Report for Chinese Application No. 201980029744.7, dated Oct. 27, 2021.

Extended European Search Report for European Application No. 19818925.0, dated Feb. 22, 2022.

English translation of the International Search Report, dated Sep. 17, 2019, for International Application No. PCT/JP2019/023096.

* cited by examiner

*Primary Examiner* — Amina S Khan

(74) *Attorney, Agent, or Firm* — Birch, Stewart, Kolasch & Birch, LLP

(57) ABSTRACT

The present invention relates to a method for producing modified cellulose fibers having cellulose I crystal structure, comprising: step A: introducing Substituent Group A to cellulose fibers via an ether bond in a solvent comprising water in the presence of a base, and step B: introducing Substituent Group B to cellulose fibers via an ether bond in a solvent comprising water in the presence of a base, wherein the method includes the steps A and B concurrently, or in the order of the step A and then the step B. The cellulose fibers of the present invention obtained by the method for production of the present invention have favorable dispersibility in a hydrophobic medium and a controlled increase in viscosity.

5 Claims, No Drawings

METHOD FOR PRODUCING MODIFIED CELLULOSE FIBER, AND MODIFIED CELLULOSE FIBER

FIELD OF THE INVENTION

The present invention relates to a method for producing modified cellulose fibers. Further, the present invention relates to modified cellulose fibers.

BACKGROUND OF THE INVENTION

Conventionally, plastic materials derived from limited resource petroleum have been widely used; however, in the recent years, techniques with less burdens on the environment have been spotlighted. In view of the technical background, materials using cellulose fibers, which are biomass existing in nature in large amounts have been remarked.

For example, Patent Publication 1 discloses modified cellulose fibers having a particular substituent structure, in which a hydroxyl functional group is hydrophobically substituted by an ether bond, for the purpose of providing cellulose fibers capable of being dispersed in an organic solvent, or the like (claim 1).

Patent Publication 1: Japanese Patent Laid-Open No. 2017-53077

SUMMARY OF THE INVENTION

The gists of the present invention relate to the following [1] to [6]:

[1] A method for producing modified cellulose fibers having cellulose I crystal structure, including:

step A: introducing one or more substituents selected from the group consisting of the following general formulas (1), (2), and (3) (Substituent Group A):

$$—R_1 \quad (1)$$

$$—CH_2—CH(OH)—R_2 \quad (2)$$

$$—CH_2—CH(OH)—CH_2—(OA)_n—O—R_2 \quad (3)$$

wherein $R_1$ is a hydrocarbon group having 1 or more carbon atoms and 4 or less carbon atoms; each of $R_2$ is independently a hydrogen or a hydrocarbon group having 1 or more carbon atoms and 4 or less carbon atoms; n is a number of 0 or more and 50 or less; and A is a divalent hydrocarbon group having 1 or more carbon atoms and 3 or less carbon atoms, to cellulose fibers via an ether bond in a solvent containing water in the presence of a base; and step B: introducing one or more substituents selected from the group consisting of the following general formulas (4), (5), and (6) (Substituent Group B):

$$—R_3 \quad (4)$$

$$—CH_2—CH(OH)—R_3 \quad (5)$$

$$—CH_2—CH(OH)—CH_2—(OA)_n—O—R_3 \quad (6)$$

wherein each of $R_3$ is independently a hydrocarbon group having 5 or more carbon atoms and 30 or less carbon atoms; n is a number of 0 or more and 50 or less; and A is a divalent hydrocarbon group having 1 or more carbon atoms and 6 or less carbon atoms, to cellulose fibers via an ether bond in a solvent containing water in the presence of a base, wherein the method includes subjecting cellulose raw materials to the step A and the step B concurrently, or in the order of the step A and then the step B.

[2] A method for producing modified cellulose fibers having cellulose I crystal structure, including:

subjecting partially modified cellulose fibers having one or more substituents, via an ether bond, selected from the group consisting of the above general formulas (1), (2), and (3) (Substituent Group A) to the following step B:

step B: introducing one or more substituents selected from the group consisting of the above general formulas (4), (5), and (6) (Substituent Group B) to the above partially modified cellulose fibers via an ether bond, in a solvent containing water in the presence of a base.

[3] Modified cellulose fibers obtained by a method for production as defined in the above [1] or [2].

[4] A method for producing a resin composition including mixing a resin and modified cellulose fibers as defined in the above [3].

[5] Modified cellulose fibers having cellulose I crystal structure, wherein each of one or more substituents selected from the group consisting of the above general formulas (1), (2), and (3) (Substituent Group A), and one or more substituents selected from the group consisting of the above general formulas (4), (5), and (6) (Substituent Group B) is independently bonded to cellulose fibers via an ether bond, wherein the modified cellulose fibers have a diffraction peak at $2\theta=18\text{-}21°$ in an X-ray diffraction analysis using CuKα rays.

[6] A dispersion containing one or more members selected from the group consisting of organic media and resins, and modified cellulose fibers as defined in the above [3] or [5].

DETAILED DESCRIPTION OF THE INVENTION

The modified cellulose fibers in Patent Publication 1 require an organic solvent and an organic base in large amounts when introducing a substituent, so that there are some disadvantages in the burden of costs of these organic solvents and organic bases themselves.

Since the modified cellulose fibers in Patent Publication 1 have a high dispersibility in a hydrophobic component such as an organic solvent or a resin, when the modified cellulose fibers are blended in a resin or the like, a molded article having excellent heat resistance and mechanical strength can be produced. In addition, since the modified cellulose fibers have a high thickening action, the modified cellulose fibers can also be utilized as a thickening agent for an organic solvent.

On the other hand, modified cellulose fibers that do not show a thickening action are also desired, from the viewpoint of handling property such as easiness in injection into a mold.

As a result of studying the above disadvantages, the present inventors have found that introduction of a specialized facility such as anti-explosive facility or risk-free facility for using these organic solvents and organic bases in the aspect of facility would be required, and introduction of a distillation or removal treatment step of the organic solvents and organic bases would be required from the aspect of process, so that a remarkable reduction in production costs can be made by controlling the amounts of these organic solvents and organic bases used.

The present invention relates to a method for producing modified cellulose fibers having excellent dispersibility in a hydrophobic component such as an organic solvent or a resin using a reaction system containing water for promising a reduction in the production costs. Further, the present invention relates to modified cellulose fibers having excellent dispersibility in a hydrophobic component such as an organic solvent or a resin, and having low thickening property.

The method for production of the present invention relates to subjection of a hydrophobic cellulose to a modification with a solvent containing water, and the present invention further relates to production of modified cellulose fibers having excellent dispersibility in a hydrophobic component such as an organic solvent or resin, while accomplishing a reduction in production costs. Furthermore, the present invention relates to modified cellulose fibers having excellent dispersibility in a hydrophobic component such as an organic solvent or resin, and low thickening property.

[Method for Producing Modified Cellulose Fibers]

The method for producing modified cellulose fibers having cellulose I crystal structure of the present invention is a method including subjecting cellulose raw materials to a step A and a step B defined below concurrently, or in the order of A and then B, in a solvent containing water in the presence of a base. By including the step A and the step B, a given substituent is introduced to cellulose fibers via an ether bond. Here, a compound used for introducing a given substituent to a cellulose raw material via an ether bond is referred to herein as "an etherification agent." Further, the phrase "introducing a substituent to cellulose fibers via an ether bond" as used herein means that a hydroxyl group on the surface of cellulose fibers and an etherification agent are reacted to bond the substituent to the hydroxyl group via an ether bond. Furthermore, the cellulose fibers to which a given substituent is introduced in any one of the step A and the step B may be herein referred to as "partially modified cellulose fibers."

[Cellulose Raw Materials]

The cellulose raw materials used in the present invention include woody raw materials (needle-leaf trees and broad-leaf trees); grassy raw materials (plant raw materials of Gramineae, Malvaceae, and Fabaceae, non-woody raw materials of plants of Palmae); pulps (cotton linter pulps obtained from fibers surrounding the cottonseeds, etc.); papers (newspapers, corrugated cardboards, magazines, high-quality paper, etc.) and the like. Among them, woody raw materials and grassy raw materials are preferred, from the viewpoint of availability and costs.

The shapes of the cellulose raw materials are preferably in fibrous, powdery, spherical, chip-like, or flaky form, from the viewpoint of handling property. In addition, it may be a mixture thereof.

The average fiber diameter of the cellulose raw materials is preferably 5 μm or more, and more preferably 7 μm or more, from the viewpoint of handling property and costs, and the average fiber diameter is preferably 500 μm or less, and more preferably 300 μm or less, from the same viewpoint.

The average fiber length of the cellulose raw materials is preferably 1,000 μm or more, and more preferably 1,500 μm or more, from the viewpoint of availability and costs, and the average fiber length is preferably 5,000 μm or less, and more preferably 3,000 μm or less, from the same viewpoint. The average fiber diameter and the average fiber length of the cellulose raw materials can be measured in accordance with the methods described in Examples set forth below.

The modified cellulose fibers having cellulose I crystal structure are produced by subjecting the cellulose raw materials to the step A and the step B. The method for production of the present invention will be described hereinbelow separately for a method in which the step A and the step B are carried out in the order of A and then B (Embodiment 1); and a method in which the step A and the step B are concurrently carried out (Embodiment 2).

[Step A of Embodiment 19

In the step A of this embodiment, cellulose raw materials and an etherification agent are reacted to obtain partially modified cellulose fibers.

[Substituent Introduced in Step A]

The substituent introduced in the step A is one or more substituents selected from the group consisting of the following general formulas (1) to (3) (referred to herein as "Substituent Group A"):

$$-R_1 \quad (1)$$

$$-CH_2-CH(OH)-R_2 \quad (2)$$

$$-CH_2-CH(OH)-CH_2-(OA)_n-O-R_2 \quad (3)$$

wherein $R_1$ is a hydrocarbon group having 1 or more carbon atoms and 4 or less carbon atoms; each of $R_2$ is independently a hydrogen or a hydrocarbon group having 1 or more carbon atoms and 4 or less carbon atoms; n is a number of 0 or more and 50 or less; and A is a divalent hydrocarbon group having 1 or more carbon atoms and 3 or less carbon atoms.

These substituents are introduced to the cellulose raw materials alone or in any combinations.

$R_1$ in the general formula (1) is a hydrocarbon group having 1 or more carbon atoms and 4 or less carbon atoms, and the hydrocarbon group has preferably 2 or more carbon atoms, from the viewpoint of introduction efficiency of the substituent, and the hydrocarbon group has preferably 3 or less carbon atoms, from the viewpoint of the reactivities. Specific examples of $R^1$ are exemplified by a methyl group, an ethyl group, a propyl group, an isopropyl group, an allyl group, a butyl group, and an isobutyl group.

$R_2$ in the general formulas (2) and (3) is a hydrogen or a hydrocarbon group having 1 or more carbon atoms and 4 or less carbon atoms, and the hydrocarbon group has preferably 2 or more carbon atoms from the viewpoint of introduction efficiency of the substituent, and the hydrocarbon group has preferably 3 or less carbon atoms, from the viewpoint of the reactivities. Specific examples of $R_2$ are exemplified by a methyl group, an ethyl group, a vinyl group, a propyl group, an isopropyl group, an allyl group, a butyl group, an isobutyl group, and a butenyl group.

n in the general formula (3) is the number of moles of an alkylene oxide added. n is a number of 0 or more and 50 or less, and n is preferably 3 or more, more preferably 5 or more, and even more preferably 10 or more, from the viewpoint of availability and costs, and n is preferably 40 or less, more preferably 30 or less, even more preferably 20 or less, and even more preferably 15 or less, from the same viewpoint and from the viewpoint of affinity with a low-polarity solvent.

A in the general formula (3) is a divalent hydrocarbon group having 1 or more carbon atoms and 3 or less carbon atoms, which forms an oxyalkylene group with an adjoining oxygen atom. The number of carbon atoms for A is preferably 2 or more, from the viewpoint of availability and costs.

Specific examples of A are preferably an ethylene group and a propylene group, and more preferably an ethylene group.

[Concentration of Cellulose Raw Materials]

The concentration when the cellulose raw materials are blended in a mixture of the entire component such as raw materials, a catalyst and a solvent in the step A (hereafter also referred to as "a mixture of the entire component") is not unconditionally determined, because the concentration depends upon the purity or shapes of the cellulose raw materials used, the structure of the etherification agent, the reaction apparatus used, and the like. The concentration is preferably 1% by mass or more, more preferably 3% by mass or more, even more preferably 5% by mass or more, and even more preferably 10% by mass or more, from the viewpoint of production efficiency, and on the other hand, the concentration is preferably 60% by mass or less, more preferably 50% by mass or less, and even more preferably 45% by mass or less, from the viewpoint of handling property.

[Solvent Containing Water]

The step A is carried out in a solvent containing water. The proportion which is occupied by water in the solvent containing water is preferably 3% by mass or more, more preferably 5% by mass or more, even more preferably 10% by mass or more, even more preferably 30% by mass or more, even more preferably 50% by mass or more, even more preferably 70% by mass or more, which may be preferably 80% or more, may be preferably 90% or more, may be preferably 95% or more, and may be preferably 99% or more. The solvent containing water may only be composed of water. The solvent containing water is preferably water, from the viewpoint of cost reduction. The solvent other than water includes solvents which dissolve in an amount of 5 g in 100 g of water at 25° C. (hereinafter also referred to as a hydrophilic solvent) as preferred ones. In a case where the solvent containing water is a mixture of water and one or more hydrophilic solvents, a mixing proportion of each solvent is not particularly limited, and a mixing proportion can be properly set in accordance with an etherification agent used.

Preferred hydrophilic solvents in this step are one or more members selected from the group consisting of ethanol, isopropanol, t-butanol, ethylene glycol, propylene glycol, 1,2-butanediol, 1,3-butanediol, N-methylpyrrolidone, dimethylformamide, dimethyl sulfoxide, dimethylacetamide, 1,3-dimethyl-2-imidazolidinone, acetone, methyl ethyl ketone, methyl isobutyl ketone, tetrahydrofuran, and 1,4-dioxane. Among these hydrophilic solvents, ethanol, isopropanol, t-butanol, ethylene glycol, propylene glycol, 1,2-butanediol, 1,3-butanediol, acetone, methyl ethyl ketone, tetrahydrofuran, and 1,4-dioxane are preferred, and ethanol, isopropanol, t-butanol, ethylene glycol, propylene glycol, 1,2-butanediol and 1,3-butanediol are more preferred, from the viewpoint of handling property and costs.

The amount of the solvent containing water used is not unconditionally determined because the amount depends upon the kinds of the cellulose raw materials and the etherification agent, and the reaction apparatus used. The amount of the solvent containing water used, based on 100 parts by mass of the cellulose raw materials, is preferably 30 parts by mass or more, more preferably 50 parts by mass or more, even more preferably 75 parts by mass or more, even more preferably 100 parts by mass or more, and even more preferably 200 parts by mass or more, from the viewpoint of the reactivities, and the amount used is preferably 10,000 parts by mass or less, more preferably 7,500 parts by mass or less, even more preferably 5,000 parts by mass or less, even more preferably 2,500 parts by mass or less, and even more preferably 1,000 parts by mass or less, from the viewpoint of productivity.

[Base]

The base functions as a catalyst or a reaction activator of a cellulose raw material, for progressing the etherification reaction. The base to be used is preferably an inorganic base, and more preferably one or more members selected from the group consisting of alkali metal hydroxides and alkaline earth metal hydroxides, from the viewpoint of burdens on facility and reduction in process burdens. Among them, preferred are sodium hydroxide, potassium hydroxide, lithium hydroxide, calcium hydroxide, and barium hydroxide, more preferred are sodium hydroxide, potassium hydroxide, and calcium hydroxide, even more preferred are sodium hydroxide and potassium hydroxide, and even more preferred is sodium hydroxide, from the viewpoint of availability and costs.

The amount of the base used cannot be unconditionally determined because the amount used depends upon the kinds of the base used and the kinds of the etherification agent used, and the amount of the base used, based on the anhydrous glucose unit of the cellulose raw materials, is preferably 0.01 equivalents or more, more preferably 0.05 equivalents or more, even more preferably 0.1 equivalents or more, and even more preferably 0.2 equivalents or more, from the viewpoint of progressing the etherification reaction, and the amount used is preferably 10 equivalents or less, more preferably 8 equivalents or less, even more preferably 5 equivalents or less, and even more preferably 3 equivalents or less, from the viewpoint of production costs. Here, the anhydrous glucose unit as used herein is abbreviated as "AGU." AGU is calculated assuming that all the cellulose raw materials are constituted by anhydrous glucose units.

The concentration when the base is blended cannot be unconditionally determined because the concentration depends upon the kinds of the base used and the kinds of the etherification agent used, and the concentration in the mixture of the entire component in the step A is preferably 0.1% by mass or more, more preferably 0.3% by mass or more, even more preferably 0.5% by mass or more, and even more preferably 1% by mass or more, from the viewpoint of production efficiency, and on the other hand, the concentration is preferably 10% by mass or less, more preferably 7.5% by mass or less, even more preferably 5% by mass or less, and even more preferably 3% by mass or less, from the viewpoint of maintaining cellulose I crystal structure.

[Etherification Agent]

The etherification agent is not particularly limited so long as Substituent Group A can be introduced to cellulose fibers during the reaction with a cellulose raw material. The etherification agent is preferably a compound having a cyclic structure group and/or a halogenated organic compound each having reactivities is preferred, and a compound having an epoxy group and/or a halogenated hydrocarbon group is more preferred, from the viewpoint of the reactivities. Each of the compounds will be described hereinbelow.

It is preferable that the compound having a substituent represented by the general formula (1) is, for example, a compound having a halogenated hydrocarbon group represented by the following general formula (1A):

$$X—R_1 \qquad (1A)$$

wherein X is a halogen atom; and $R^1$ is a hydrocarbon group having 1 or more carbon atoms and 4 or less carbon atoms.

As the compound, one prepared in accordance with a known technique may be used, or a commercially available product may be used. A total number of carbon atoms of the compound is 1 or more, and preferably 2 or more, from the viewpoint of efficiency in the introduction of a hydrophobic group, and a total number of carbon atoms is preferably 4 or less, and more preferably 3 or less, from the viewpoint of the reactivities.

The number of carbon atoms and specific examples of $R_1$ in the general formula (1A) are the same as the number of carbon atoms and specific examples of $R^1$ in the general formula (1).

Specific examples of the compound represented by the general formula (1A) include chloromethane, chloroethane, 1-chloropropane, 2-chloropropane, 1-chlorobutane, 2-chlorobutane, bromomethane, bromoethane, 1-bromopropane, 2-bromopropane, 1-bromobutane, 2-bromobutane, iodomethane, iodoethane, 1-iodopropane, 2-iodopropane, 1-iodobutane, and 2-iodobutane.

It is preferable that the compound having a substituent represented by the general formula (2) is, for example, an alkylene oxide compound represented by the following general formula (2A):

(2A)

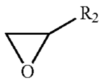

wherein $R_2$ is a hydrogen or a hydrocarbon group having 1 or more carbon atoms and 4 or less carbon atoms.

As the compound, one prepared in accordance with a known technique may be used, or a commercially available product may be used. A total number of carbon atoms of the compound is 2 or more, preferably 3 or more, and more preferably 4 or more, from the viewpoint of efficiency in the introduction of a hydrophobic group, and a total number of carbon atoms is preferably 6 or less, and more preferably 5 or less, from the viewpoint of the reactivities.

The number of carbon atoms and specific examples of $R_2$ in the general formula (2A) are the same as the number of carbon atoms and specific examples of $R_2$ in the general formula (2).

Specific examples of the compound represented by the general formula (2A) include ethylene oxide, propylene oxide, butylene oxide, 3,4-epoxy-1-butene, 1,2-epoxypentane, 1,2-epoxyhexane, and 1,2-epoxy-5-hexene.

It is preferable that the compound having a substituent represented by the general formula (3) is, for example, a glycidyl ether compound represented by the following general formula (3A):

(3A)

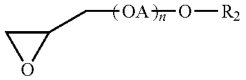

wherein $R_2$ is a hydrogen or a hydrocarbon group having 1 or more carbon atoms and 4 or less carbon atoms; n is a number of 0 or more and 50 or less; and A is a divalent hydrocarbon group having 1 or more carbon atoms and 3 or less carbon atoms.

As the compound, one prepared in accordance with a known technique may be used, or a commercially available product may be used. A total number of carbon atoms of the compound is preferably 3 or more, more preferably 4 or more, and even more preferably 5 or more, from the viewpoint of efficiency in the introduction of a hydrophobic group, and a total number of carbon atoms is preferably 100 or less, more preferably 50 or less, even more preferably 25 or less, and even more preferably 10 or less, from the viewpoint of mechanical strength, heat resistance, and dimensional stability of the molded article of the resin composition obtained when the modified cellulose fibers are applied to a resin composition.

The number of carbon atoms and specific examples of $R_2$ in the general formula (3A) are the same as the number of carbon atoms and specific examples of $R_2$ in the general formula (3).

n in the general formula (3A) is the number of moles of an alkylene oxide added. The preferred range for the value of n is the same as the preferred range for the value of n in the general formula (3).

A in the general formula (3A) is a divalent hydrocarbon group having 1 or more carbon atoms and 3 or less carbon atoms, which forms an oxyalkylene group with an adjoining oxygen atom. The preferred range for the number of carbon atoms and specific examples of A are the same as the preferred range for the number of carbon atoms and specific examples of A in the general formula (3).

Specific examples of the compound represented by the general formula (3A) include glycidol, methyl glycidyl ether, ethyl glycidyl ether, propyl glycidyl ether, isoprenyl glycidyl ether, allyl glycidyl ether, and butyl glycidyl ether.

The amount of the etherification agent used cannot be unconditionally determined because the amount used depends upon the desired degree of introduction of the substituent in the modified cellulose fibers obtained and the structure of the etherification agent used. The amount of the compound, based on 1 unit of the anhydrous glucose unit of the cellulose raw materials, is, for example, preferably 10.0 equivalents or less, more preferably 8.0 equivalents or less, even more preferably 7.0 equivalents or less, and even more preferably 6.0 equivalents or less, and preferably 0.02 equivalents or more, more preferably 0.05 equivalents or more, even more preferably 0.1 equivalents or more, even more preferably 0.3 equivalents or more, and even more preferably 1.0 equivalent or more, from the viewpoint of mechanical strength of the molded article of the resin composition obtained when the modified cellulose fibers are applied to a resin composition. Here, when two or more kinds of etherification agents are used, the amount of the etherification agent is a total amount of individual etherification agents.

The concentration when the etherification agent is blended in the mixture of the entire component in the step A cannot be unconditionally determined because the concentration depends upon the desired degree of introduction of the substituent in the modified cellulose fibers obtained and the structure of the etherification agent used. The concentration is preferably 1% by mass or more, more preferably 5% by mass or more, even more preferably 10% by mass or more, even more preferably 15% by mass or more, and even more preferably 17% by mass or more, from the viewpoint of reaction efficiency, and on the other hand, the concentration is preferably 80% by mass or less, more preferably 70% by mass or less, even more preferably 60% by mass or less, even more preferably 55% by mass or less, and even more preferably 52% by mass or less, from the viewpoint of production efficiency.

[Etherification Reaction]

The etherification reaction of the etherification agent and the cellulose raw materials can be carried out by mixing both the components in a solvent containing water in the presence of a base.

The mixing conditions are not particularly limited so long as the cellulose raw materials and the etherification agent are homogeneously mixed, so that the reaction can be sufficiently progressed, and continuous mixing treatment may or may not be carried out. In a case where a relatively large reaction vessel is used, stirring may be appropriately carried out from the viewpoint of controlling the reaction temperature.

The temperature in the step A cannot be unconditionally determined because the temperature depends upon the kinds of the cellulose raw materials and the etherification agent and the targeted degree of introduction. The temperature is preferably 25° C. or higher, more preferably 30° C. or higher, even more preferably 35° C. or higher, even more preferably 40° C. or higher, and even more preferably 45° C. or higher, from the viewpoint of improving the reactivities, and the temperature is preferably 120° C. or lower, more preferably 110° C. or lower, even more preferably 100° C. or lower, even more preferably 90° C. or lower, even more preferably 80° C. or lower, and even more preferably 70° C. or lower, from the viewpoint of inhibiting pyrolysis. In addition, heating and cooling processes may be optionally provided.

The time in the step A cannot be unconditionally determined because the time depends upon the kinds of the cellulose raw materials and the etherification agent and the targeted degree of introduction. The time is preferably 0.1 hours or more, more preferably 0.5 hours or more, even more preferably 1 hour or more, even more preferably 3 hours or more, even more preferably 6 hours or more, and even more preferably 10 hours or more, from the viewpoint of the reactivities, and the time is preferably 60 hours or less, more preferably 48 hours or less, and even more preferably 36 hours or less, from the viewpoint of productivity.

Subsequent to the step A, a post-treatment can be appropriately carried out, in order to remove an unreacted compound, an unreacted base, or the like. As the method for a post-treatment, for example, an unreacted base can be neutralized with an acid (an organic acid, an inorganic acid, or the like) (neutralization treatment), and thereafter washing can be carried out with a solvent in which an unreacted compound or base is dissolved (washing treatment). As desired, drying (vacuum drying or the like) may be further carried out.

On the other hand, surprisingly, it is preferred not to carry out a washing treatment mentioned above, from the viewpoint of increasing the reactivities of the substituent introduced in the step B, thereby improving the degree of molar substitution of Substituent Group B. In other words, it is preferable not to have a washing treatment step between the step A and the step B, from the viewpoint of the reactivities in the step B. This is considered to be due to the fact that an unreacted by-product of Substituent Group A of the step A acts as a compatibilization agent of Substituent Group B and the solvent of the step B. For example, when propylene oxide is used as the substituent group in the step A, it is considered that propylene glycol is formed as a by-product, which acts as a compatibilization agent. By omitting a washing treatment step, the effects of reduction in environmental burdens due to reduction in the amount of wastewater, and improvements in production efficiency due to process shortening can also be expected.

Step B of Embodiment 1

In the step B of this embodiment, partially modified cellulose fibers obtained through the step A and an etherification agent are reacted, to provide modified cellulose fibers.

Since the partially modified cellulose fibers obtained through the step A are partially modified cellulose fibers having Substituent Group A via an ether bond, Embodiment 1 of the present invention is a method for producing modified cellulose fibers having cellulose I crystal structure, including subjecting partially modified cellulose fibers to the following step B:

step B: introducing one or more substituents selected from the group consisting of the following general formulas (4), (5), and (6) (Substituent Group B):

$$—R_3 \quad (4)$$

$$—CH_2—CH(OH)—R_3 \quad (5)$$

$$—CH_2—CH(OH)—CH_2—(OA)_n—O—R_3 \quad (6)$$

wherein each of $R_3$ is independently a hydrocarbon group having 5 or more carbon atoms and 30 or less carbon atoms; n is a number of 0 or more and 50 or less; and A is a divalent hydrocarbon group having 1 or more carbon atoms and 6 or less carbon atoms, to the above partially modified cellulose fibers via an ether bond, in a solvent containing water in the presence of a base.

[Substituent Introduced in Step B]

The substituent introduced in the step B is one or more substituents selected from the group consisting of the above general formulas (4) to (6) (referred to herein as "Substituent Group B"). These substituents are introduced alone or in any combinations.

$R_3$ in the general formulas (4), (5) and (6) is a hydrocarbon group having 5 or more carbon atoms and 30 or less carbon atoms, and the hydrocarbon group has a number of carbon atoms of preferably 7 or more carbon atoms, from the viewpoint of exhibition of hydrophobicity, and the hydrocarbon group has a number of carbon atoms of preferably 26 or less, more preferably 22 or less, and even more preferably 18 or less, from the viewpoint of availability and the reactivities. Specific examples of $R_3$ are exemplified by saturated alkyl groups such as a pentyl group, a hexyl group, a heptyl group, an octyl group, a 2-ethylhexyl group, a nonyl group, a decyl group, an undecyl group, a dodecyl group, a hexadecyl group, an octadecyl group, an icosyl group, and a triacontyl group; unsaturated alkyl groups such as a hexenyl group, a heptenyl group, an octenyl group, a nonenyl group, a decenyl group, an undecenyl group, a dodecenyl group, a hexadecenyl group, and an octadecenyl group; and hydrocarbon groups having a cyclic structure such as a cyclohexyl group, a phenyl group, a benzyl group, a cresyl group, a naphthyl group, and a trityl group.

n in the general formula (6) is the number of moles of an alkylene oxide added. n is a number of 0 or more and 50 or less, and n is preferably 3 or more, more preferably 5 or more, and even more preferably 10 or more, from the viewpoint of availability and costs, and n is preferably 40 or less, more preferably 30 or less, even more preferably 20 or less, and even more preferably 15 or less, from the same viewpoint.

A in the general formula (6) is a divalent hydrocarbon group having 1 or more carbon atoms and 6 or less carbon atoms, which forms an oxyalkylene group with an adjoining oxygen atom. The number of carbon atoms for A is preferably 2 or more, from the viewpoint of availability and costs, and the number of carbon atoms is preferably 4 or less, and more preferably 3 or less, from the same viewpoint. Specific examples of A are preferably an ethylene group and a propylene group, and more preferably an ethylene group.

[Concentration of Partially Modified Cellulose Fibers]

The concentration when the partially modified cellulose fibers are blended in a mixture of the entire component in the step B is not unconditionally determined, because the concentration depends upon the structure of the etherification agent, the reaction apparatus used, and the like. The concentration is preferably 1% by mass or more, more preferably 3% by mass or more, even more preferably 5% by mass or more, and even more preferably 10% by mass or more, from the viewpoint of production efficiency, and on the other hand, the concentration is preferably 60% by mass or less, more preferably 50% by mass or less, even more preferably 45% by mass or less, and even more preferably 40% by mass or less, from the viewpoint of handling property.

[Solvent Containing Water]

The step B is carried out in a solvent containing water. The preferred range for the solvent in the step B is the same as the solvent containing water in the step A.

The amount of the solvent containing water used is not unconditionally determined because the amount depends upon the kinds of the etherification agent, the reaction apparatus used, and the like, and the amount used is the same as the amount of the solvent containing water used in the step A.

[Base]

The base used in this step includes, but not particularly limited to, those listed in the step A.

The amount of the base cannot be unconditionally determined because the amount depends upon the kinds of the base used and the kinds of the etherification agent used, and the amount is the same as the amount of the base in the step A.

The concentration of the base cannot be unconditionally determined because the concentration depends upon the kinds of the base used and the kinds of the etherification agent used. The preferred range in the mixture of the entire component in the step B is the same as the concentration of the base in the step A.

[Etherification Agent]

The etherification agent is not particularly limited so long as Substituent Group B can be introduced to partially modified cellulose fibers when reacted with partially modified cellulose fibers obtained through the step A. It is preferable to use a compound having a cyclic structure group and/or a halogenated organic compound each having reactivities, and more preferable to use a compound having an epoxy group and/or a halogenated hydrocarbon group, from the viewpoint of the reactivities. Each of the compounds will be exemplified hereinbelow.

It is preferable that the compound having a substituent represented by the general formula (4) is, for example, a compound having a halogenated hydrocarbon group represented by the following general formula (4B):

$$X—R_3 \qquad (4B)$$

wherein X is a halogen atom; and $R_3$ is a hydrocarbon group having 5 or more carbon atoms and 30 or less carbon atoms.

As the compound, one prepared in accordance with a known technique may be used, or a commercially available product may be used. A total number of carbon atoms of the compound is 6 or more, preferably 8 or more, and more preferably 10 or more, from the viewpoint of exhibition of hydrophobicity, and a total number of carbon atoms is preferably 26 or less, more preferably 22 or less, and even more preferably 18 or less, from the viewpoint of availability and the reactivities.

The number of carbon atoms and specific examples of $R_3$ in the general formula (4B) are the same as the number of carbon atoms and specific examples of $R_3$ in the general formula (4).

Specific examples of the compound represented by the general formula (4B) include 1-chloropentane and an isomer thereof, 1-chlorohexane and an isomer thereof, 1-chlorohexane and an isomer thereof, 1-chlorodecane and an isomer thereof, 1-chlorododecane and an isomer thereof, 1-chlorohexadecane and an isomer thereof, 1-chlorooctadecane and an isomer thereof, 1-chloroeicosane and an isomer thereof, 1-chlorotriaconsane and an isomer thereof, 1-chloro-5-hexene and an isomer thereof, chlorocyclohexane, chlorobenzene, benzyl chloride, naphthyl chloride, trityl chloride, and compounds in which chlorine of the above compounds is substituted with bromine or iodine.

It is preferable that the compound having a substituent represented by the general formula (5) is, for example, an alkylene oxide compound represented by the following general formula (5B):

(5B)

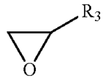

wherein $R_3$ is a hydrocarbon group having 5 or more carbon atoms and 30 or less carbon atoms.

As the compound, one prepared in accordance with a known technique may be used, or a commercially available product may be used. A total number of carbon atoms of the compound is 8 or more, preferably 10 or more, and more preferably 12 or more, from the viewpoint of exhibition of hydrophobicity, and a total number of carbon atoms is preferably 24 or less, more preferably 22 or less, and even more preferably 20 or less, from the viewpoint of the reactivities.

The number of carbon atoms and specific examples of $R_3$ in the general formula (5B) are the same as the number of carbon atoms and specific examples of $R_3$ in the general formula (5).

Specific examples of the compound represented by the general formula (5B) include 1,2-epoxyoctane, 1,2-epoxydecane, 1,2-epoxy-9-decene, 1,2-epoxydodecane, 1,2-epoxyhexadecane, 1,2-epoxyoctadecane, 1,2-epoxy-17-octadecene, 1,2-epoxyeicosane, styrene oxide and derivatives thereof.

It is preferable that the compound having a substituent represented by the general formula (6) is, for example, a glycidyl ether compound represented by the following general formula (6B):

(6B)

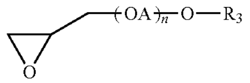

wherein $R_3$ is a hydrocarbon group having 5 or more carbon atoms and 30 or less carbon atoms; n is a number of 0 or more and 50 or less; and A is a divalent hydrocarbon group having 1 or more carbon atoms and 6 or less carbon atoms.

As the compound, one prepared in accordance with a known technique may be used, or a commercially available product may be used. A total number of carbon atoms of the compound is 9 or more, preferably 11 or more, and more preferably 13 or more, from the viewpoint of exhibition of hydrophobicity, and a total number of carbon atoms is preferably 100 or less, more preferably 75 or less, and even more preferably 50 or less, from the viewpoint of the reactivities.

The number of carbon atoms and specific examples of $R_3$ in the general formula (6B) are the same as the number of carbon atoms and specific examples of $R_3$ in the general formula (6).

n in the general formula (6B) is the number of moles of an alkylene oxide added. The preferred range for the value of n is the same as the preferred range for the value of n in the general formula (6).

A in the general formula (6B) is a divalent hydrocarbon group having 1 or more carbon atoms and 6 or less carbon atoms, which forms an oxyalkylene group with an adjoining oxygen atom. The preferred range for the number of carbon atoms and specific examples of A are the same as the preferred range for the number of carbon atoms and specific examples of A in the general formula (6).

Specific examples of the compound represented by the general formula (6B) include 2-ethylhexyl glycidyl ether, dodecyl glycidyl ether, stearyl glycidyl ether, isostearyl glycidyl ether, polyoxyalkylene alkyl ethers, 5-hexenyl glycidyl ether, 9-decenyl glycidyl ether, 9-octadecenyl glycidyl ether, 17-octadecenyl glycidyl ether, phenyl glycidyl ether, trityl glycidyl ether, benzyl glycidyl ether, methylphenyl glycidyl ether, and derivatives thereof.

The amount of the etherification agent cannot be unconditionally determined because the amount depends upon the desired degree of introduction of the substituent in the modified cellulose fibers obtained and the structure of the etherification agent used, and the amount of the etherification agent is the same as the amount of the etherification agent of the step A.

The concentration of the etherification agent in the mixture of the entire component in the step B cannot be unconditionally determined because the concentration depends upon the desired degree of introduction of the substituent and the structure of the etherification agent used, and the concentration of the etherification agent is the same as the concentration of the etherification agent of the step A.

[Etherification Reaction]

The etherification reaction of the etherification agent and the partially modified cellulose fibers obtained through the step A can be carried out by mixing both the components in a solvent containing water in the presence of a base.

The mixing conditions are not particularly limited so long as the partially modified cellulose fibers obtained through the step A and the etherification agent are homogeneously mixed, so that the reaction can be sufficiently progressed, and continuous mixing treatment may or may not be carried out. In a case where a relatively large reaction vessel is used, stirring may be appropriately carried out, from the viewpoint of controlling the reaction temperature.

The temperature in the step B has the same preferred range as that of the reaction temperature of the step A, from the viewpoint of improving the reactivities.

The time in the step B has the same preferred range as that of the reaction time of the step A, from the viewpoint of the reactivities.

Subsequent to the step B, a similar treatment to that subsequent to the step A may be carried out.

Embodiment 2

In this embodiment, the cellulose raw materials and two kinds of etherification agents (specifically, an etherification agent for providing Substituent Group A and an etherification agent for providing Substituent Group B) are reacted concurrently, to provide modified cellulose fibers.

[Concentration of Cellulose Raw Materials]

The concentration when the cellulose raw materials are blended in a mixture of the entire component such as raw materials, a catalyst and a solvent in this embodiment is not unconditionally determined, because the concentration depends upon the purity or shapes of the cellulose raw materials used, the structure of the etherification agent, the reaction apparatus used, and the like. The concentration has the same preferred range as that of the step A of Embodiment 1, from the viewpoint of production efficiency.

[Solvent Containing Water]

The above etherification reaction is carried out in a solvent containing water. The solvent containing water may be only composed of water, in the same manner as in the step A of Embodiment 1. The range of the content of water in the solvent containing water and the specific examples of the solvent other than water are the same as in the step A of Embodiment 1.

The amount of the solvent containing water used, based on 100 parts by mass of the cellulose raw materials, has the same preferred range as that of the step A of Embodiment 1, from the viewpoint of the reactivities.

[Base]

The base functions as a catalyst or a reaction activator of a cellulose raw material, for progressing the etherification reaction. The base to be used is preferably those listed in the step A of Embodiment 1, from the viewpoint of progressing the etherification reaction in the solvent containing water.

The amount of the base used, based on the anhydrous glucose unit of the cellulose raw materials, has the same preferred range as that of the step A of Embodiment 1, from the viewpoint of progressing the etherification reaction.

The concentration in the mixture of the entire component when the base is blended has the same preferred range as that of the step A of Embodiment 1, from the viewpoint of production efficiency.

[Etherification Agent]

As the etherification agent, for example, the esterification agent for introducing Substituent Group A includes those listed in the step A of Embodiment 1, and the esterification agent for introducing Substituent Group B includes those listed in the step B of Embodiment 1.

The amount of the esterification agent for introducing Substituent Group A, based on 1 unit of the anhydrous glucose unit of the cellulose raw materials, has the same preferred range as that of the step A of Embodiment 1. The amount of the esterification agent for introducing Substituent Group B, based on 1 unit of the anhydrous glucose unit of the cellulose raw materials, has the same preferred range as that of the step A of Embodiment 1. Here, when two or more kinds of etherification agents are used, the amount of the etherification agent is a total amount of individual etherification agents. The ratio of the amount of the etherification agent for introducing Substituent Group A to the amount of the etherification agent for introducing Substituent Group B may be properly changed depending upon the desired degree of introduction of the substituent.

The concentration of the etherification agent in the mixture of the entire component has the same preferred range as that of the step A of Embodiment 1, from the viewpoint of reaction efficiency.

[Etherification Reaction]

The etherification reaction of the etherification agent and the cellulose raw materials can be carried out by mixing both the components in a solvent containing water in the presence of a base. The order of mixing of the etherification agent for introducing Substituent Group A and the etherification agent for introducing Substituent Group B is not particularly limited. For example, the etherification agent for introducing Substituent Group A may be first mixed with the cellulose raw materials, or the etherification agent for introducing Substituent Group B may be first mixed with the cellulose raw materials, or both the etherification agents may be concurrently mixed with the cellulose raw materials.

The mixing conditions are not particularly limited so long as the cellulose raw materials and the etherification agent are homogeneously mixed, so that the reaction can be sufficiently progressed, and continuous mixing treatment may or may not be carried out. In a case where a relatively large reaction vessel is used, stirring may be appropriately carried out, from the viewpoint of controlling the reaction temperature.

The temperature in the steps A and B has the same preferred range as that of the step A of Embodiment 1, from the viewpoint of improving the reactivities.

The time in the steps A and B has the same preferred range as that of the step A of Embodiment 1, from the viewpoint of the reactivities.

Subsequent to the reaction, a post-treatment can be appropriately carried out, in order to remove an unreacted compound, an unreacted base, or the like. As the method for a post-treatment, for example, an unreacted base can be neutralized with an acid (an organic acid, an inorganic acid, or the like), and thereafter washing can be carried out with a solvent in which an unreacted compound or base is dissolved. As desired, drying (vacuum drying or the like) may be further carried out.

[Modified Cellulose Fibers of the Present Invention and Modified Cellulose Fibers Produced by the Method of the Present Invention]

The modified cellulose fibers of the present invention and the modified cellulose fibers produced by the method of the present invention have cellulose I crystal structure, in which the method includes introducing one or more substituents selected from the group consisting of the above general formulas (1) to (3) (Substituent Group A), and one or more substituents selected from the group consisting of the above general formulas (4) to (6) (Substituent Group B), to the cellulose fibers via an ether bond. The modified cellulose fibers more preferably have a diffraction peak at 2θ=18-21° in X-ray diffraction analysis using CuKα rays.

As a result of various studies, the present inventors have found out that modified cellulose fibers having a particular structure as defined above have a low thickening property, while maintaining high dispersibility in a hydrophobic medium, and the present invention has been perfected thereby. Although the details of the mechanisms in which the modified cellulose fibers having a particular structure have the features described above are not elucidated, it is assumed to be caused by a specific crystal structure having a diffraction at 2θ=18-21° in the X-ray diffraction analysis using CuKα rays.

A specific structure of the modified cellulose fibers can be, for example, represented by the following general formula:

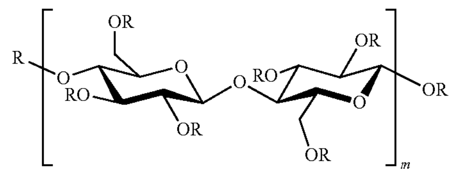

wherein each of R's is independently a hydrogen, Substituent Group A, or Substituent Group B, wherein at least one of R's is Substituent Group A, and wherein at least one of R's is Substituent Group B, wherein each of substituents belonging to Substituent Group A and Substituent Group B may be identical or different, with proviso that a case where all R's are simultaneously hydrogens is excluded; and m is preferably an integer of 20 or more and 3,000 or less.

m in the above general formula is preferably 20 or more, and more preferably 100 or more, from the viewpoint of exhibiting mechanical strength and toughness of the molded article of the resin composition obtained when the modified cellulose fibers are applied to a resin composition, and m is preferably 3,000 or less, and more preferably 2,000 or less, from the same viewpoint.

The details of each substituent in the above general formula are as described above.

[Crystallinity]

The crystallinity of the modified cellulose fibers is preferably 10% or more, more preferably 15% or more, and even more preferably 20% or more, from the viewpoint of exhibiting strength of the molded article obtained when the modified cellulose fibers are applied to a resin composition. In addition, the crystallinity is preferably 90% or less, more preferably 85% or less, even more preferably 80% or less, and even more preferably 75% or less, from the viewpoint of availability of the raw materials. The crystallinity of the cellulose as used herein is a cellulose I crystallinity calculated from diffraction intensity values according to X-ray diffraction method, which can be measured in accordance with a method described in Examples set forth below. Here, cellulose I is a crystalline form of a natural cellulose, and the cellulose I crystallinity means a proportion of the amount of crystalline region that occupies the entire cellulose. The presence or absence of the cellulose I crystal structure can be judged by the presence of a peak at 2θ=22.6° in the X-ray diffraction measurement described in Examples set forth below.

[Diffraction Peak at 2θ=18-21°]

The matter of the modified cellulose fibers having (or have) a diffraction peak at 2θ=18-21° in the X-ray diffraction analysis using CuKα rays refers to an areal ratio of the diffraction peaks of 0.21 or more, and a height ratio of the diffraction peaks of 0.23 or more, as obtained by the calculation formulas described in Examples set forth below.

The areal ratio of the diffraction peaks is preferably 0.21 or more, and more preferably 0.22 or more, from the viewpoint of lowering the viscosity of the dispersion obtained when the modified cellulose fibers are dispersed in a hydrophobic medium. The height ratio of the diffraction peaks is preferably 0.23 or more, and more preferably 0.24 or more, from the same viewpoint. The judgment of the diffraction peak at 2θ=18-21° can be carried out by a method described in Examples set forth below.

[Molar Substitution (MS)]

In the modified cellulose fibers, the molar amount of Substituent Group A introduced to the cellulose, based on one mol of the anhydrous glucose unit (molar substitution: MS), is preferably 0.001 or more, more preferably 0.005 or more, more preferably 0.01 or more, even more preferably 0.03 or more, even more preferably 0.05 or more, even more preferably 0.1 or more, and even more preferably 0.3 or more, from the viewpoint of exhibition of hydrophobicity and dispersibility. On the other hand, MS is preferably 1.5 or less, more preferably 1.3 or less, even more preferably 1.0 or less, and even more preferably 0.8 or less, from the viewpoint of exhibiting mechanical strength and toughness of the molded article obtained when the modified cellulose fibers have cellulose I crystal structure, and the modified cellulose fibers are applied to a resin composition. Here, when Substituent Group A is constituted by a plural species of substituents, the MS of Substituent Group A is a total of MS of each of the substituents.

In the modified cellulose fibers, the molar amount of Substituent Group B introduced to the cellulose, based on one mol of the anhydrous glucose unit (molar substitution: MS), is preferably 0.001 or more, more preferably 0.005 or more, and even more preferably 0.02 or more, and preferably 1.5 or less, more preferably 1.3 or less, even more preferably 1.0 or less, and even more preferably 0.8 or less, from the same viewpoint as in Substituent Group A. Here, when Substituent Group B is constituted by a plural species of substituents, the MS of Substituent Group B is a total of MS of each of the substituents.

The degree of introduction of the substituent (in other words, molar substitution (MS)) as used herein can be measured in accordance with the method described in Examples set forth below.

[Average Fiber Diameter]

The average fiber diameter of the modified cellulose fibers may be, for example, the same range as those of the cellulose raw materials, irrelevant to the kinds of the substituents, or the modified cellulose fibers may be optionally subjected to fine pulverization, to have an average fiber diameter of from several nanometers to several hundred nanometers.

In the case of the former, the average fiber diameter is preferably 5 μm or more. The average fiber diameter is more preferably 7 μm or more, even more preferably 10 μm or more, and even more preferably 15 μm or more, from the viewpoint of handling property, availability, and costs. In addition, the upper limit is, but not particularly set to, preferably 10,000 μm or less, more preferably 5,000 μm or less, even more preferably 1,000 μm or less, even more preferably 500 μm or less, and still even more preferably 100 μm or less, from the viewpoint of handling property.

In the case of the latter, the average fiber diameter of the modified cellulose fibers is preferably 1 nm or more, more preferably 3 nm or more, even more preferably 10 nm or more, and even more preferably 20 nm or more, from the viewpoint of handling property, availability, and costs, and the average fiber diameter is preferably less than 1 μm, preferably 500 nm or less, more preferably 300 nm or less, and even more preferably 200 nm or less, from the viewpoint of handling property, and dispersibility in a solvent, a resin or the like.

Here, the average fiber diameter of the modified cellulose fibers can be obtained in accordance with the method described in Examples set forth below.

[Finely Pulverizing Treatment]

The modified cellulose fibers according to the present invention may be further subjected to a finely pulverizing treatment. The finely pulverizing treatment may be carried out before the modification or after the modification. For example, the modified cellulose fibers can be finely pulverized by a treatment using a grinder such as Masscolloider, or a treatment using a high-pressure homogenizer or the like in a solvent.

[Viscosity]

One of the features of the modified cellulose fibers of the present invention is in that the thickening action is low even when blended in an organic solvent, a resin or the like. Since the thickening action is low, it is preferable because the handling property of injection to a mold or the like is increased.

Specifically, the viscosity of the dispersion of the modified cellulose fibers, the content of solid ingredients of which is 0.5% by mass, is preferably 1 mPads or more, more preferably 5 mPas or more, and even more preferably 10 mPads or more, from the viewpoint of securing mechanical strength when formed into a molded article. On the other hand, the viscosity is preferably 500 mPads or less, more preferably 300 mPa·s or less, and even more preferably 100 mPads or less, from the viewpoint of inhibiting the thickening action.

The method for determining a viscosity is carried out with modified cellulose fibers to be measured that are subjected to a finely pulverizing treatment, and the viscosity is specifically measured in accordance with the method described in Examples set forth below.

[Dispersion of the Present Invention]

The dispersion of the present invention contains one or more members selected from the group consisting of organic media and resins, and the above modified cellulose fibers of the present invention.

Since the dispersion of the present invention has favorable workability and excellent heat resistance, the dispersion can be suitably used in various applications such as daily sundries, household electric appliance parts, and automobile parts. Specifically, the dispersion can be suitably used in, for example, daily sundries, cosmetics, wrapping materials for household electric appliances, and the like; electronic materials constituting electronic parts and the like; food containers such as blistered packs and trays, and lids for lunch boxes; industrial trays used in transportation or protections of industrial parts; automobile parts such as dashboards, instrumental panels, and floor; and the like.

[Organic Medium]

The organic medium used in the dispersion of the present invention includes, but not particularly limited to, organic solvents and organic media containing a reactive functional group.

The organic medium used in the present invention has a dielectric constant at 25° C. of preferably 75 or less, more preferably 55 or less, and even more preferably 45 or less, and preferably 1 or more, more preferably 2 or more, and even more preferably 3 or more, from the viewpoint of affinity with the modified cellulose fibers. Here, the dielectric constant of the organic media can be measured at 25° C. with a dielectric constant meter for liquids Model 871 manufactured by Nihon Rufuto Co., Ltd.

The organic solvent includes alcohols such as methanol, ethanol, isopropyl alcohol, 2-butanol, 1-pentanol, octyl alcohol, glycerol, ethylene glycol, and propylene glycol; carboxylic acids such as acetic acid; hydrocarbons such as hexane, heptane, octane, decane, and liquid parrafins; aromatic hydrocarbons such as toluene and xylene; amides such as dimethyl sulfoxide, N,N-dimethylformamide (DMF), dimethylacetamide, and acetanilide; ketones such as acetone, methyl ethyl ketone, methyl isobutyl ketone, and cyclohexanone; halogenated products such as methylene chloride and chloroform; carbonates such as ethylene carbonate, propylene carbonate, dimethyl carbonate, and diethyl carbonate; esters such as methyl acetate, ethyl acetate, propyl acetate, butyl acetate, methyl butyrate, sorbitan fatty acid esters, polyoxyethylene sorbitan fatty acid esters, polyoxyethylene sorbitol fatty acid esters, glycerol fatty acid esters, and polyoxyethylene fatty acid esters; polyethers such as polyethylene glycol and polyoxyethylene alkyl ethers; silicone oils such as poly(dimethyl siloxane); acetonitrile, propionitrile, ester oil, salad oil, soybean oil, castor oil, and the like. These organic solvents can be used alone or in a combination of two or more kinds.

In addition, the organic medium containing a reactive functional group includes, for example, acrylates such as methyl acrylate, methyl methacrylate, ethyl acrylate, ethyl methacrylate, butyl acrylate, butyl methacrylate, n-hexyl acrylate, n-hexyl methacrylate, 2-ethylhexyl acrylate, 2-ethylhexyl methacrylate, and phenyl glycidyl ether acrylate; urethane prepolymers such as hexamethylene diisocyanate urethane prepolymers and phenyl glycidyl ether acrylate toluene diisocyanate urethane prepolymers; glycidyl ethers such as n-butyl glycidyl ether, 2-ethylhexyl glycidyl ether, stearyl glycidyl ether, styrene oxide, phenyl glycidyl ether, nonylphenyl glycidyl ether, butylphenyl glycidyl ether, 1,6-hexanediol diglycidyl ether, ethylene glycol diglycidyl ether, and diethylene glycol diglycidyl ether; chlorostyrene, methoxystyrene, butoxystyrene, vinylbenzoic acid, and the like.

The blending amount of the organic medium in the dispersion is preferably 30% by mass or more, more preferably 50% by mass or more, and even more preferably 80% by mass or more, from the viewpoint of handling property. On the other hand, the blending amount is preferably 98% by mass or less, more preferably 97% by mass or less, and even more preferably 96% by mass or less, from the same viewpoint.

[Resin]

The resin can be selected depending upon the applications or the desired properties or physical properties, and the resin may be any one of thermosetting resins, photo-curable resins, thermoplastic resins, and elastomeric resins. The resins may be used alone or in a combination of two or more kinds.

In the present invention, it is preferable that the resin contains a thermosetting resin, from the viewpoint of strength, thermal properties, and the like.

The thermosetting resin includes, for example, epoxy resins, unsaturated polyester resins, vinyl ester resins, acrylic resins, phenol resins, urea resins, melamine resins, aniline resins, polyimide resins, bismaleimide resins, and the like. These thermosetting resins may be used alone or in a combination of two or more kinds.

As the elastomeric resin, a diene-based rubber or a non-diene-based rubber is preferred.

The diene-based rubber includes natural rubbers, polyisoprene rubbers, polybutadiene rubbers, styrene-butadiene copolymer rubbers, butyl rubbers, butadiene-acrylonitrile copolymer rubbers, chloroprene rubbers, modified natural rubbers, and the like. The modified natural rubber includes epoxidized natural rubbers, hydrogenated natural rubbers, and the like. The non-diene-based rubber includes butyl rubbers, ethylene-propylene rubbers, ethylene-propylene-diene rubbers, urethane rubbers, fluorine-containing rubbers, acrylic rubbers, vulcanized rubbers, epichlorohydrin rubbers, and the like. These can be used alone or in a combination of two or more kinds.

Among the thermosetting resins, the epoxy resin is preferred. The epoxy resin includes, for example, glycidyl ether-based epoxy resins, glycidyl amine-based epoxy resins, glycidyl ester-based epoxy resins, alkene oxides, triglycidyl isocyanurate, and the like. The epoxy resins may be used alone or in a combination of two or more kinds.

The blending amount of the resin in the dispersion of the present invention is preferably 1% by mass or more, more preferably 2% by mass or more, and even more preferably 3% by mass or more. On the other hand, the above blending amount is preferably 20% by mass or less, more preferably 15% by mass or less, and even more preferably 10% by mass or less.

In a case where a resin is a thermosetting resin, the dispersion of the present invention may contain a curing agent or a curing accelerator.

The curing agent can be properly selected depending upon the kinds of the resin. For example, the curing agent in a case where a resin is an epoxy resin includes, for example, amine-based curing agents, phenol resin-based curing agents, acid anhydride-based curing agents, polymercaptan-based curing agents, latent curing agents (boron trifluoride-amine complexes, dicyandiamide, carboxylic acid hydrazide, and the like), and the like. The curing agents may be used alone or in a combination of two or more kinds. Here, the curing agent may act as a curing accelerator.

The proportion of the curing agent can be properly selected depending upon the kinds of the resins and the curing agents, and the like, and the proportion is, for example, preferably from 0.1 to 300 parts by mass, based on 100 parts by mass of the resin.

The curing accelerator can also be properly selected depending upon the kinds of the resins. For example, the curing accelerator in a case where a resin is an epoxy resin includes, for example, phosphines, amines, and the like. The curing accelerators may be used alone or in a combination of two or more kinds.

The proportion of the curing accelerator can be properly selected depending upon the kinds of the curing agents and the like, and the proportion is, for example, preferably from 0.01 to 100 parts by mass, based on 100 parts by mass of the epoxy resin.

[Other Components]

The dispersion of the present invention can contain, as other components besides those mentioned above, a plasticizer; a crystal nucleating agent; a filler including an inorganic filler and an organic filler; a hydrolysis inhibitor; a flame retardant; an antioxidant; a lubricant such as a hydrocarbon wax or an anionic surfactant; an ultraviolet absorbent; an antistatic agent; an anti-clouding agent; a photostabilizer; a pigment; a mildewproof agent; a bactericidal agent; a blowing agent; a surfactant; a polysaccharide such as starch or alginic acid; a natural protein such as gelatin, glue, or casein; an inorganic compound such as tannin, zeolite, ceramics, or a metal powder; a perfume; a fluidity modulator; a leveling agent; an electroconductive agent; an ultraviolet dispersant; a deodorant;

or the like, within the range that would not impair the effects of the present invention. In addition, similarly, other polymeric materials and other resin compositions can be added within the range that would not impair the effects of the present invention.

When the dispersion of the present invention contains “other components” mentioned above, the blending amount of the other components can be properly set within the range that would not impair the effects of the present invention. For example, the blending amount is preferably 10% by mass or so or less, and more preferably 5% by mass or so or less, of the dispersion.

[Method for Preparing Dispersion]

The dispersion of the present invention can be prepared by subjecting a resin and/or an organic medium, and modified cellulose fibers which are mentioned above to a dispersion treatment with a high-pressure homogenizer together with optionally a curing agent, a curing accelerator and/or other components. Alternatively, the dispersion of the present invention can be prepared by agitating these raw materials with a Henschel mixer, a co-rotating agitator or the like, or melt-kneading with a known kneader such as a tightly closed kneader, a single-screw or twin-screw extruder, or an open roller-type kneader.

[Method for Producing Resin Composition of the Present Invention]

The resin composition in the present invention contains a resin mentioned above, and modified cellulose fibers (of the present invention or obtained by the method for production of the present invention) mentioned above, and the resin composition may contain an organic medium and/or other components mentioned above. Therefore, the dispersion of the present invention mentioned above also falls under a resin composition. The resin composition can be produced by mixing the resin and the modified cellulose fibers, or alternatively mixing the resin, the modified cellulose fibers, and the organic medium (and/or other components). Therefore, the method for producing a resin composition of the present invention includes mixing a resin and modified cellulose fibers.

The method for mixing each component includes a method including subjecting each component to a dispersion treatment with a high-pressure homogenizer; alternatively a method including agitating each component with a Henschel mixer, a co-rotating agitator, or the like; alternatively a method including melt-kneading each component with a known kneader such as a tightly closed kneader, a single-screw or twin-screw extruder, or an open roller-type kneader. Further, a part or all of volatile components may be optionally removed from a resin composition, and the composition after the removal also falls under a resin composition.

A molded article can be produced by a known molding method using a dispersion mentioned above or the resin composition.

With respect to the above-mentioned embodiments, the present invention further discloses the following methods for producing modified cellulose fibers, modified cellulose fibers, a method for producing a resin composition, and a dispersion containing modified cellulose.

<1>A method for producing modified cellulose fibers having cellulose I crystal structure, including:

step A: introducing one or more substituents selected from the group consisting of the following general formulas (1), (2), and (3) (Substituent Group A):

$$-R_1 \quad (1)$$

$$-CH_2-CH(OH)-R_2 \quad (2)$$

$$-CH_2-CH(OH)-CH_2-(OA)_n-O-R_2 \quad (3)$$

wherein $R_1$ is a hydrocarbon group having 1 or more carbon atoms and 4 or less carbon atoms; each of $R_2$ is independently a hydrogen or a hydrocarbon group having 1 or more carbon atoms and 4 or less carbon atoms; n is a number of 0 or more and 50 or less; and A is a divalent hydrocarbon group having 1 or more carbon atoms and 3 or less carbon atoms, to cellulose fibers via an ether bond in a solvent containing water in the presence of a base; and step B: introducing one or more substituents selected from the group consisting of the following general formulas (4), (5), and (6) (Substituent Group B):

$$-R_3 \quad (4)$$

$$-CH_2-CH(OH)-R_3 \quad (5)$$

$$-CH_2-CH(OH)-CH_2-(OA)_n-O-R_3 \quad (6)$$

wherein each of $R_3$ is independently a hydrocarbon group having 5 or more carbon atoms and 30 or less carbon atoms; n is a number of 0 or more and 50 or less; and A is a divalent hydrocarbon group having 1 or more carbon atoms and 6 or less carbon atoms, to cellulose fibers via an ether bond in a solvent containing water in the presence of a base, wherein the method includes subjecting raw cellulose materials to the step A and the step B concurrently.

<2>A method for producing modified cellulose fibers having cellulose I crystal structure, wherein the method includes the step A and the step B in the order of the step A and the step B.

<3> The method for production according to <1> or <2>, wherein the content of water in the solvent containing water in the step A is 80% or more, preferably 90% or more, more preferably 95% or more, more preferably 99% or more, and more preferably 100%.

<4> The method for production according to any one of <1> to <3>, wherein the content of water in the solvent containing water in the step B is 80% or more, preferably 90% or more, more preferably 95% or more, more preferably 99% or more, and more preferably 100%.

<5> The method for production according to any one of <1> to <4>, wherein the method for production carries out the step A and then the step B, wherein a washing treatment step is not carried out between the step A and the step B.

<6> The method for production according to any one of <1> to <5>, wherein the formula for a substituent introduced in the step (A) is (2), wherein $R_2$ is a hydrocarbon group having 1 or more carbon atoms and 4 or less carbon atoms, and wherein the formula for a substituent introduced in the step (B) is any one of (4) to (6), wherein $R_3$ is a hydrocarbon group having 6 or more carbon atoms and 20 or less carbon atoms.

<7> The method for production according to any one of <1> to <5>, wherein the formula for a substituent introduced in the step (A) is (2), wherein $R_2$ is a methyl group or an ethyl group, and wherein the formula for a substituent introduced in the step (B) is any one of (4) to (6), wherein $R_3$ is a hydrocarbon group having 6 or more carbon atoms and 20 or less carbon atoms.

<8> The method for production according to any one of <1> to <5>, wherein the formula for a substituent introduced in the step (A) is (2), wherein $R_2$ is a hydrocarbon group having 1 or more carbon atoms and 4 or less carbon atoms, and wherein the formula for a substituent introduced in the step (B) is (6), wherein $R_3$ is a hydrocarbon group having 6 or more carbon atoms and 20 or less carbon atoms.

<9> The method for production according to any one of <1> to <5>, wherein the formula for a substituent introduced in the step (A) is (2), wherein $R_2$ is a methyl group or an ethyl group, and wherein the formula for a substituent introduced in the step (B) is (6), wherein $R_3$ is a hydrocarbon group having 6 or more carbon atoms and 20 or less carbon atoms.

<10> The method for production according to any one of <1> to <5>, wherein the formula for a substituent introduced in the step (A) is (1) or (3), wherein $R_2$ is a hydrocarbon group having 1 or more carbon atoms and 4 or less carbon atoms, and wherein the formula for a substituent introduced in the step (B) is any one of (4) to (6), wherein $R_3$ is a hydrocarbon group having 6 or more carbon atoms and 20 or less carbon atoms.

<11> The method for production according to any one of <1> to <5>, wherein the formula for a substituent introduced in the step (A) is (1) or (3), wherein $R_2$ is a hydrocarbon group having 1 or more carbon atoms and 4 or less carbon atoms, and wherein the formula for a substituent introduced in the step (B) is (6), wherein $R_3$ is a hydrocarbon group having 6 or more carbon atoms and 20 or less carbon atoms.

<12>A method for producing modified cellulose fibers having cellulose I crystal structure, including subjecting partially modified cellulose fibers having one or more substituents, via an ether bond, selected from the group consisting of the following general formulas (1), (2), and (3) (Substituent Group A):

$$-R_1 \quad (1)$$

$$-CH_2-CH(OH)-R_2 \quad (2)$$

$$-CH_2-CH(OH)-CH_2-(OA)_n-O-R_2 \quad (3)$$

wherein $R_1$ is a hydrocarbon group having 1 or more carbon atoms and 4 or less carbon atoms; each of $R_2$ is independently a hydrogen or a hydrocarbon group having 1 or more carbon atoms and 4 or less carbon atoms; n is a number of 0 or more and 50 or less; and A is a divalent hydrocarbon group having 1 or more carbon atoms and 3 or less carbon atoms, to the following step B:

step B: introducing one or more substituents selected from the group consisting of the following general formulas (4), (5), and (6) (Substituent Group B):

$$-R_3 \quad (4)$$

$$-CH_2-CH(OH)-R_3 \quad (5)$$

$$-CH_2-CH(OH)-CH_2-(OA)_n-O-R_3 \quad (6)$$

wherein each of $R_3$ is independently a hydrocarbon group having 5 or more carbon atoms and 30 or less carbon atoms; n is a number of 0 or more and 50 or less; and A is a divalent hydrocarbon group having 1 or more carbon atoms and 6 or less carbon atoms, to the above partially modified cellulose fibers via an ether bond in a solvent containing water in the presence of a base.

<13> The method for production according to <12>, wherein the content of water in the solvent containing water in the step B is 80% or more, preferably 90% or more, more preferably 95% or more, more preferably 99% or more, and more preferably 100%.

<14> The method for production according to <12> or <13>, wherein the formula for a substituent in the partially modified cellulose fibers is (2), wherein $R_2$ is a hydrocarbon group having 1 or more carbon atoms and 4 or less carbon atoms, and wherein the formula for a substituent introduced in the step (B) is any one of (4) to (6), wherein $R_3$ is a hydrocarbon group having 6 or more carbon atoms and 20 or less carbon atoms.

<15> The method for production according to <12> or <13>, wherein the formula for a substituent in the partially modified cellulose fibers is (2), wherein $R_2$ is a methyl group or an ethyl group, and wherein the formula for a substituent introduced in the step (B) is any one of (4) to (6), wherein $R_3$ is a hydrocarbon group having 6 or more carbon atoms and 20 or less carbon atoms.

<16> The method for production according to <12> or <13>, wherein the formula for a substituent in the partially modified cellulose fibers is (2), wherein $R_2$ is a hydrocarbon group having 1 or more carbon atoms and 4 or less carbon atoms, and wherein the formula for a substituent introduced in the step (B) is (6), wherein $R_3$ is a hydrocarbon group having 6 or more carbon atoms and 20 or less carbon atoms.

<17> The method for production according to <12> or <13>, wherein the formula for a substituent in the partially modified cellulose fibers is (2), wherein $R_2$ is a methyl group or an ethyl group, and wherein the formula for a substituent introduced in the step (B) is (6), wherein $R_3$ is a hydrocarbon group having 6 or more carbon atoms and 20 or less carbon atoms.

<18> The method for production according to <12> or <13>, wherein the formula for a substituent in the partially modified cellulose fibers is (1) or (3), wherein $R_2$ is a hydrocarbon group having 1 or more carbon atoms and 4 or less carbon atoms, and wherein the formula for a substituent introduced in the step (B) is any one of (4) to (6), wherein $R_3$ is a hydrocarbon group having 6 or more carbon atoms and 20 or less carbon atoms.

<19> The method for production according to <12> or <13>, wherein the formula for a substituent in the partially modified cellulose fibers is (1) or (3), wherein $R_2$ is a hydrocarbon group having 1 or more carbon atoms and 4 or less carbon atoms, and wherein the formula for a substituent introduced in the step (B) is (6), wherein $R_3$ is a hydrocarbon group having 6 or more carbon atoms and 20 or less carbon atoms.

<20>Modified cellulose fibers obtained by a method for production as defined in any one of <1> to <19>.

<21>A method for producing a resin composition, including mixing a resin with modified cellulose fibers obtained by a method for production as defined in <1> to <19> to form a composite.

<22>Modified cellulose fibers having cellulose I crystal structure, wherein each of:

one or more substituents selected from the group consisting of the following general formulas (1), (2), and (3) (Substituent Group A):

$$-R_1 \quad (1)$$

$$-CH_2-CH(OH)-R_2 \quad (2)$$

$$-CH_2-CH(OH)-CH_2-(OA)_n-O-R_2 \quad (3)$$

wherein $R^1$ is a hydrocarbon group having 1 or more carbon atoms and 4 or less carbon atoms; each of $R_2$ is independently a hydrogen or a hydrocarbon group having 1 or more carbon atoms and 4 or less carbon atoms; n is a number of 0 or more and 50 or less; and A is a divalent hydrocarbon group having 1 or more carbon atoms and 3 or less carbon atoms, and one or more substituents selected from the group consisting of the following general formulas (4), (5), and (6) (Substituent Group B):

$$-R_3 \quad (4)$$

$$-CH_2-CH(OH)-R_3 \quad (5)$$

$$-CH_2-CH(OH)-CH_2-(OA)_n-O-R_3 \quad (6)$$

wherein each of $R_3$ is independently a hydrocarbon group having 5 or more carbon atoms and 30 or less carbon atoms; n is a number of 0 or more and 50 or less; and A is a divalent hydrocarbon group having 1 or more carbon atoms and 6 or less carbon atoms, is independently bonded to the cellulose fibers via an ether bond, wherein the modified cellulose fibers have a diffraction peak at 2θ=18-21° in X-ray diffraction analysis using CuKα rays.

<23> The modified cellulose fibers according to <22>, wherein the formula for a substituent in Substituent Group (A) is (2), wherein $R_2$ is a hydrocarbon group having 1 or more carbon atoms and 4 or less carbon atoms, and wherein the formula for a substituent in Substituent Group B is any one of (4) to (6), wherein $R_3$ is a hydrocarbon group having 6 or more carbon atoms and 20 or less carbon atoms.

<24> The modified cellulose fibers according to <22>, wherein the formula for substituent in Substituent Group (A) is (2), wherein $R_2$ is a methyl group or an ethyl group, and wherein the formula for a substituent in Substituent Group B is any one of (4) to (6), wherein $R_3$ is a hydrocarbon group having 6 or more carbon atoms and 20 or less carbon atoms.

<25> The modified cellulose fibers according to <22>, wherein the formula for a substituent in Substituent Group (A) is (2), wherein $R_2$ is a hydrocarbon group having 1 or more carbon atoms and 4 or less carbon atoms, and wherein the formula for a substituent in Substituent Group B is (6), wherein $R_3$ is a hydrocarbon group having 6 or more carbon atoms and 20 or less carbon atoms.

<26> The modified cellulose fibers according to <22>, wherein the formula for a substituent in Substituent Group (A) is (2), wherein $R_2$ is a methyl group or an ethyl group, and wherein the formula for a substituent in Substituent Group B is (6), wherein $R_3$ is a hydrocarbon group having 6 or more carbon atoms and 20 or less carbon atoms.

<27> The modified cellulose fibers according to <22>, wherein the formula for a substituent in Substituent Group (A) is (1) or (3), wherein $R_2$ is a hydrocarbon group having 1 or more carbon atoms and 4 or less carbon atoms, and wherein the formula for a substituent in Substituent Group B is any one of (4) to (6), wherein $R_3$ is a hydrocarbon group having 6 or more carbon atoms and 20 or less carbon atoms.

<28> The modified cellulose fibers according to <22>, wherein the formula for a substituent in Substituent Group (A) is (1) or (3), wherein $R_2$ is a hydrocarbon group having 1 or more carbon atoms and 4 or less carbon atoms, and wherein the formula for a substituent in Substituent Group B is (6), wherein $R_3$ is a hydrocarbon group having 6 or more carbon atoms and 20 or less carbon atoms.

<29> The modified cellulose fibers according to any one of <20> and <22> to <28>, wherein the viscosity of a dispersion of the modified cellulose fibers, the content of solid ingredients of which is 0.5% by mass, is 1 mPads or more and 500 m Pads or less.

<30>A dispersion containing one or more members selected from the group consisting of organic media and/or resins, and modified cellulose fibers as defined in any one of <20> and <24> to <29>.

EXAMPLES

The present invention will be described more specifically by means of the following Production Examples, Examples, Comparative Examples and Test Examples. Here, the Examples and the like are mere exemplifications of the present invention, without intending to limit the present invention thereto. Parts in Examples are parts by mass unless specified otherwise. Here, "ambient pressure" means 101.3 kPa, and "room temperature" means 25° C. Here, in the following Production Examples and the like, for the sake of convenience, cellulosed fibers obtained through one of the step A or the step B are described as "partially modified cellulose fibers."

[Confirmation of Crystal Structure in Cellulose Fibers and the Like]

The crystal structure of the cellulose fibers, the partially modified cellulose fibers, and the modified cellulose fibers is confirmed by measuring with a diffractometer manufactured by Rigaku Corporation under the trade name of "Rigaku RINT 2500VC X-RAY diffractometer" under the following conditions.

Conditions for preparing measurement pellets: A pressure in the range of from 10 to 20 MPa is applied with a tablet molding machine, to prepare smooth pellets having an area 320 $mm^2$× a thickness 1 mm.

Conditions for X-Ray Diffraction Analysis: a step angle of 0.01°, a scanning speed of 10°/min, and a measurement range: an angle of diffraction 2θ=5-45°

X-Ray Source: Cu/Kα-Radiation, tube voltage: 40 kv, tube current: 120 mA

Peak Splitting Conditions: After the background noise is removed, a fitting is carried out in a Gaussian function so that a difference in errors between 2θ=13-23° falls within 5%.

The crystal structure of the modified cellulose fibers is confirmed by the measurement with the above diffractometer under the above conditions.

The crystallinity of cellulose I crystal structure is calculated using areas of X-ray diffraction peaks obtained by the above peak splitting on the basis of the following formula (A).

Cellulose I Crystallinity (%)= [IcR/(IcR+Iam)]×100 (A)

wherein IcR is an area of diffraction peaks of a lattice face (002 face) (angle of diffraction 2θ=22-23°, and Iam is an area of diffraction peaks of an amorphous portion (angle of diffraction 20=) 18.5°, in X-ray diffraction.

[Judgment of Presence or Absence of Diffraction Peaks at 2θ=18-21°]

The judgment on the presence or absence of the diffraction peaks at 2θ=18-21° of the modified cellulose fibers is made by measuring with the above diffractometer under the above conditions, and calculating on the bases of the calculation formulas given below, using the areas of X-ray diffraction peaks obtained by the above peak splitting. Here, if an areal ratio of the diffraction peaks obtained by the following calculation formula is 0.21 or more, and a height ratio of the diffraction peaks is 0.23 or more, it is judged that the modified cellulose fibers to be measured have diffraction peaks at 2θ=18-21°.

<Calculation Formulas>

Areal Ratio of Diffraction Peaks=(Areas of Diffraction Peaks at 20=) 18-21°/(Areas of Diffraction Peaks at 20=) 22-23°

Height Ratio of Diffraction Peaks=(Height of Diffraction Peaks at 20=) 18-21°/(Height of Diffraction Peaks at 20=) 22-23°

[Degree of Introduction of Substituent]

First, the % content (% by mass) of the substituent contained in the cellulose fibers to be measured is calculated in accordance with Zeisel method, which is known as a method of analyzing an average number of moles added of alkoxy groups of the cellulose ethers described in *Analytical Chemistry,* 51 (13), 2172 (1979), "Fifteenth Revised Japan Pharmacopeia (Section of Method of Analyzing Hydroxypropyl Cellulose)" or the like. The procedures are shown hereinbelow.

(i) To a 200 mL volumetric flask is added 0.1 g of n-tetradecane, and filled up to a marked line with hexane, to provide an internal standard solution.

(ii) Seventy milligrams of cellulose fibers to be measured that are previously purified and dried, and 80 mg of adipic acid are accurately weighed in a 10 mL vial jar, 2 mL of hydroiodic acid is added thereto, and the vial jar is tightly sealed.

(iii) The mixture in the above vial jar is heated with a block heater at 160° C. for 1 hour, while stirring with stirrer chips.

(iv) After heating, 2 mL of the internal standard solution and 2 mL of diethyl ether are sequentially injected to the vial, and a liquid mixture is stirred at room temperature for 1 minute.

(v) An upper layer (diethyl ether layer) of the mixture separated in two layers in the vial jar is analyzed by gas chromatography with one manufactured by SHIMADZU Corporation under the trade name of "GC2010Plus."

(vi) The analyses are carried out in the same manner as in (ii) to (v) except that the cellulose fibers to be measured are changed to 5 mg, 10 mg, and 15 mg of an etherification agent used in the modification, to draw a calibration curve of the etherification agent.

(vii) From the drawn calibration curve and the analytical results of the cellulose fibers to be measured, the substituents contained in the cellulose fibers to be measured is quantified. The analytical conditions are as follows.

Column: one manufactured by Agilent Technologies, under the trade name of DB-5, 12 m, 0.2 mm×0.33 μm Column Temperature: 30° C. (holding for 10 min), →at 10° C./min, →300° C. (holding for 10 min)

Injector Temperature: 300° C.

Detector Temperature: 300° C.

Injection Amount: 1 μL

The content of the substituents contained in the cellulose fibers to be measured, % by mass, is calculated from a detected amount of the etherification agent used.

Next, from the content of the substituents obtained, the molar substitution (MS), which is a molar amount of substituents based on one mol of the anhydrous glucose unit, is calculated using the following mathematical formula (1). Here, MS in the step A is defined as MSA, and MS in the step B is defined as MSB.

Math Formula (1):

$$MSA=(WA/Mw_A)/((100-WA-WB)/162.14)$$

$$MSB=(WB/Mw_B)/((100-WA-WB)/162.14)$$

WA: The content of the substituent introduced in the step A in the cellulose fibers to be measured, % by mass WB: The content of the substituent introduced in the step B in the cellulose fibers to be measured, % by mass $Mw_A$: The molecular weight of the etherification agent introduced in the step A, g/mol $Mw_B$: The molecular weight of the etherification agent introduced in the step B, g/mol

[Average Fiber Diameter and Average Fiber Length of Cellulose Raw Materials and Modified Cellulose Fibers]

(1) When the average fiber diameter of the cellulose fibers to be measured is assumed to be from several nanometers to several hundred nanometers, the average fiber diameter of the cellulose fibers is obtained as follows.

Water or ethanol is added to the cellulose fibers to be measured to prepare a dispersion of which concentration is 0.0001% by mass. The dispersion is added dropwise to mica (mica), and dried to provide an observation sample. A fiber height of the cellulose fibers in the observation sample is measured with an atomic force microscope (AFM), Nanoscope III Tapping mode AFM, manufactured by Digital Instrument, a probe used being Point Probe (NCH) manufactured by NANOSENSORS. During the measurement, 100 or more strands of cellulose fibers are extracted from a microscopic image in which the cellulose fibers can be confirmed, and an average fiber diameter is calculated from the fiber heights of the fibers. An average fiber length is calculated from a distance in the direction of fibers. An average aspect ratio is calculated by an average fiber length/an average fiber diameter, and the standard deviation thereof is also calculated. Generally, a minimum unit of cellulose nanofibers prepared from higher plants is packed in nearly square form having sizes of 6×6 molecular chains, so that the height analyzed in the image according to the AFM can be assumed to be a width of the fibers.

(2) When the average fiber diameter of the cellulose fibers to be measured is assumed to be from several hundred nanometers to several thousand nanometers, the average fiber diameter of the cellulose fibers is obtained as follows.

Ion-exchanged water is added to cellulose fibers to be measured, to prepare a dispersion, a content of which is 0.01% by mass. The dispersion is measured with a wet-dispersion type image analysis particle distribution counter manufactured by JASCO International Co., Ltd. under the trade name of IF-3200, under the conditions of a front lens: 2 folds, telecentric zoom lens: 1 fold, image resolution: 0.835 μm/pixel, syringe inner diameter: 6,515 μm, spacer thickness: 500 μm, image recognition mode: ghost, threshold: 8, amount of analytical sample: 1 mL, and sampling: 15%. One hundred or more strands of cellulose fibers are measured. An average ISO fiber diameter thereof is calculated as an average fiber diameter, and an average ISO fiber length is calculated as an average fiber length.

[Presence or Absence of Double Refraction and Measurement of Viscosity]

<Preparation of Dispersion of Modified Cellulose Fibers>

The amount 0.25 g of the modified cellulose fibers are supplied to 49.75 g of toluene, and a mixture is stirred with a homogenizer T.K. ROBOMICS manufactured by PRIMIX Corporation at 3,000 Rpm for 30 minutes, and thereafter subjected to a 10-pass treatment with a high-pressure homogenizer "Nano Vater LES" manufactured by YOSHIDA KIKAI CO., LTD. at 100 MPa, to prepare a dispersion of modified cellulose fibers, in which finely pulverized modified cellulose fibers are dispersed, a content of solid ingredients of which is 0.5% by mass.

<Presence or Absence of Double Refraction>

In order to evaluate dispersibility of the above dispersion of modified cellulose fibers, a content of solid ingredients of which is 0.5% by mass, the dispersion is placed between orthogonal polarization plates, and vibrations are applied, to evaluate double refraction.

Rank A: presence of distinct double refraction; Rank B: capable of confirming double refraction but not distinct; and Rank C: no double refraction.

The dispersibility is evaluated in the order of A>B>C, and Rank A indicates that the modified cellulose fibers are dispersed in a solvent in a completely nano-level.

<Measurement of Viscosity>

The viscosity of the above dispersion of modified cellulose fibers, a content of solid ingredient of which is 0.5% by mass is measured with an E-type viscometer "VISCOMETER TVE-35h" manufactured by TOKI SANGYO CO., LTD., using a cone rotor: 1° 34'×$R_{24}$, and a temperature-controller "VISCOMATE VM-150III" manufactured by TOKI SANGYO CO., LTD., under the conditions of 25° C., 1 Rpm, and one minute. It is shown that the lower the measured viscosity, the more excellent the inhibition of thickening.

Production Example A of Etherification Agent <Production of Isostearyl Glycidyl Ether>

Ten kilograms of isostearyl alcohol manufactured by Kao Corporation, 0.36 kg of tetrabutylammonium bromide, 7.5 kg of epichlorohydrin, and 10 kg of hexane were supplied into a 100-L reactor, and the contents were mixed under a nitrogen atmosphere. While holding the liquid mixture at 50° C., 12 kg of a 48% by mass aqueous sodium hydroxide solution was added dropwise thereto over 30 minutes. After the termination of the dropwise addition, the mixture was continued stirring at 50° C. for additional 4 hours to be aged, and thereafter the reaction mixture was washed with 13 kg of water repeatedly 8 times, to remove salts and alkali. Thereafter, the internal reactor temperature was raised to 90° C., hexane was distilled off from an organic layer, and the mixture was further purged with steam under a reduced pressure of 6.6 kPa to remove low-boiling point compounds. After dehydration, the mixture was subjected to a reduced-pressure distillation at an internal reactor temperature of 250° C. and an internal reactor pressure of 1.3 kPa, to provide 8.6 kg of isostearyl glycidyl ether in a liquid state.

Production Example B of Etherification Agent <Production of Polyoxyalkylene Alkyl Etherification Agent>

A 1,000-L reactor was charged with 250 kg of a polyoxyethylene (13)-n-alkyl (C12) ether, in a molten state, and further 3.8 kg of tetrabutylammonium bromide, 81 kg of epichlorohydrin, and 83 kg of toluene were supplied into the reactor, and the contents were mixed while stirring. While maintaining the internal reactor temperature at 50° C., 130 kg of a 48% by mass aqueous sodium hydroxide solution was added dropwise thereto for 1 hour with stirring. After the termination of the dropwise addition, the mixture was aged for 6 hours with stirring, while maintaining the internal reactor temperature at 50° C. After the termination of aging, the reaction mixture was washed with 250 kg of water 6 times to remove salts and alkali, and thereafter an organic layer was heated to 90° C. under a reduced pressure of 6.6 kPa, to distill off the residual epichlorohydrin, solvents, and water. The mixture was further purged with 250 kg of steam under a reduced pressure, to remove low-boiling point compounds, to provide 240 kg of an n-alkyl (C12) polyoxyethylene (13) glycidyl ether (EMULGEN 120GE) having a structure of the following formula:

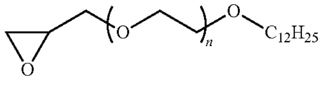

This compound was referred to as a polyoxyalkylene alkyl etherification agent (abbreviated as "POA etherification agent").

Production Example C of Etherification Agent <Production of Stearyl Glycidyl Ether >

Ten kilograms of stearyl alcohol manufactured by Kao Corporation, 0.36 kg of tetrabutylammonium bromide, 7.5 kg of epichlorohydrin, and 10 kg of hexane were supplied into a 100-L reactor, and the contents were mixed under a nitrogen atmosphere. While holding the liquid mixture at 50° C., 12 kg of a 48% by mass aqueous sodium hydroxide solution was added dropwise thereto over 30 minutes. After the termination of the dropwise addition, the same treatments as in Production Example A mentioned above were carried out, to provide 8.6 kg of white stearyl glycidyl ether.

Production Example 1 of Partially Modified Cellulose Fibers <Step A: Addition of Propylene Oxide to Cellulose >

A needle-leaf bleached kraft pulp, hereinafter abbreviated as NBKP, manufactured by West Fraser, under the trade name of "Hinton," in a fibrous form, having an average fiber diameter of 24 μm, a cellulose content of 90% by mass, and a water content of 5% by mass, was used as the cellulose raw materials. First, to 1.5 g of absolutely dried NBKP was added 1.5 g of a 6.4% by mass aqueous sodium hydroxide solution, 0.26 equivalents of NaOH per AGU, and homogeneously mixed. Thereafter, 0.65 g of propylene oxide, 1.2 equivalents per AGU, was added thereto as an etherification agent. The system was tightly closed, and the reaction was then carried out by allowing the mixture to stand at 50° C. for 2 hours. After the reaction, the reaction mixture was neutralized with acetic acid, and sufficiently washed with water and acetone, respectively, to remove impurities, and the washed mixture was vacuum-dried overnight at 70° C., to provide Partially Modified Cellulose Fibers 1 (MS of propylene oxide: 0.14).

Production Example 2 of Partially Modified Cellulose Fibers <Step A: Addition of Propylene Oxide to Cellulose >

According to Production Example 1, Partially Modified Cellulose Fibers 2 (MS of propylene oxide: 0.46) were obtained, with following the conditions defined in Table A.

Production Example 3 of Partially Modified Cellulose Fibers <Step A: Addition of Butylene Oxide to Cellulose >

According to Production Example 1, Partially Modified Cellulose Fibers 3 (MS of butylene oxide: 0.18) were obtained, with following the conditions defined in Table A.

Production Example 4 of Partially Modified Cellulose Fibers <Step A: Addition of Butylene Oxide to Cellulose >

According to Production Example 1, Partially Modified Cellulose Fibers 4 (MS of butylene oxide: 0.44) were obtained, with following the conditions defined in Table A.

Production Example 5 of Partially Modified Cellulose Fibers <Step A: Addition of Allyl Glycidyl Ether to Cellulose >

According to Production Example 1, Partially Modified Cellulose Fibers 5 (MS of allyl glycidyl ether: 0.19) were obtained, with following the conditions defined in Table A.

Production Example 6 of Partially Modified Cellulose Fibers <Step A: Addition of Ethyl Group to Cellulose >

According to Production Example 1, Partially Modified Cellulose Fibers 6 (MS of ethyl group: 0.36) were obtained, with following the conditions defined in Table A.

TABLE A

| | | Production Examples | | | | | |
|---|---|---|---|---|---|---|---|
| | | 1 | 2 | 3 | 4 | 5 | 6 |
| Aqueous NaOH Solution | Concentration, % by mass | 6.4 | | | | | 12 |
| | Amount, g | 1.5 | | | | | 6.2 |
| | Equivalents/AGU | 0.26 | | | | | 2.0 |
| Etherification Agent | Kinds | Propylene oxide | | Butylene oxide | | Allyl glycidyl ether | Iodoethane |
| | Amount, g | 0.65 | 1.29 | 1.0 | 2.0 | 3.2 | 2.2 |
| | Equivalents/AGU | 1.2 | 2.4 | 1.5 | 3.0 | 3.0 | 1.5 |

TABLE A-continued

| | | Production Examples | | | | | |
|---|---|---|---|---|---|---|---|
| | | 1 | 2 | 3 | 4 | 5 | 6 |
| Conditions for reaction while allowing to stand | Temperature, ° C. | 50 | | | | 70 | |
| | Time, h | 2 | | 4 | | 24 | |

Example 1<Step B: Addition of 2-Ethylhexyl Glycidyl Ether >

To 1.5 g of Partially Modified Cellulose Fibers 1 was added 1.5 g of a 12% by mass aqueous sodium hydroxide solution, 0.56 equivalents of NaOH per AGU, and homogeneously mixed. Thereafter, 1.6 g of 2-ethylhexyl glycidyl ether, 1.0 equivalent per AGU, was added thereto as an etherification agent. The system was tightly closed, and the reaction was then carried out by allowing the mixture to stand at 70° C. for 24 hours. After the reaction, the neutralization, the washing, and the vacuum drying were carried out in the same manner as in Production Example 1, to provide modified cellulose fibers.

Examples 2 to 4 and Comparative Example 1<Step B: Addition of 2-Ethylhexyl Glycidyl Ether >

The same procedures as in Example 1 were carried out except that the amount of 2-ethylhexyl glycidyl ether was unified at 1.0 equivalent per AGU, and that the partially modified cellulose fibers to be etherified in the step B were changed to those listed in Table 1, to provide each of modified cellulose fibers (Examples 2 to 4) and partially modified cellulose fibers (Comparative Example 1).

Example 5<Step B: Addition of Dodecyl Glycidyl Ether >

To 1.5 g of Partially Modified Cellulose Fibers 1 was added 1.5 g of a 6.4% by mass aqueous sodium hydroxide solution, 0.27 equivalents of NaOH per AGU, and homogeneously mixed. Thereafter, 2.1 g of dodecyl glycidyl ether, 1.0 equivalent per AGU, was added thereto as an etherification agent. The system was tightly closed, and the reaction was then carried out by allowing the mixture to stand at 70° C. for 24 hours. After the reaction, the neutralization, the washing, and the vacuum drying were carried out in the same manner as in Production Example 1, to provide modified cellulose fibers.

Examples 6 to 8 and Comparative Example 2<Step B: Addition of Dodecyl Glycidyl Ether>

The same procedures as in Example 5 were carried out except that the amount of dodecyl glycidyl ether was unified at 1.0 equivalent per AGU, and that the partially modified cellulose fibers to be etherified in the step B were changed to those listed in Table 1, to provide each of modified cellulose fibers (Examples 6 to 8) and partially modified cellulose fibers (Comparative Example 2).

TABLE 1

| | | Examples | | | | | | | | | |
|---|---|---|---|---|---|---|---|---|---|---|---|
| | | (Comp. Ex. 1) | 1 | 2 | 3 | 4 | (Comp. Ex. 2) | 5 | 6 | 7 | 8 |
| Step A | Cellulose Raw Material | — | NBKP | | | | — | NBKP | | | |
| | Etherification Agent | — | Propylene oxide | | Butylene oxide | | — | Propylene oxide | Butylene oxide | Allyl glycidyl ether | Iodoethane |
| | Formula of Substituent | — | (2) | | | | — | (2) | | (3) | (1) |
| | Structure of $R_1$ or $R_2$ | — | $—CH_3$ | | $—C_2H_5$ | | — | $—CH_3$ | $—C_2H_5$ | $—C_3H_6$ | $—C_2H_5$ |
| | Number of Carbon Atoms of $R_1$ or $R_2$ | — | 1 | | 2 | | — | 1 | 2 | 3 | 2 |
| | Solvent | — | Water | | | | — | Water | | | |
| | Catalyst | — | NaOH | | | | — | NaOH | | | |
| | MSA | — | 0.14 | 0.46 | 0.18 | 0.44 | — | 0.14 | 0.18 | 0.19 | 0.36 |
| Step B | Partially Modified Cellulose Fibers | (NBKP) | 1 | 2 | 3 | 4 | (NBKP) | 1 | 3 | 5 | 6 |
| | Etherification Agent | 2-Ethylhexyl glycidyl ether | | | | | | Dodecyl glycidyl ether | | | |
| | Formula of Substituent | (6) | | | | | | | | | |
| | Structure of $R_3$ | $—C_8H_{17}$ | | | | | | $—C_{12}H_{25}$ | | | |
| | Number of Carbon Atoms of $R_3$ | 8 | | | | | | 12 | | | |
| | A/n | —/— | | | | | | | | | |
| | Solvent | Water | | | | | | | | | |
| | Catalyst | NaOH | | | | | | | | | |
| | MSB | 0.00 | 0.11 | 0.33 | 0.18 | 0.43 | 0.00 | 0.09 | 0.22 | 0.14 | 0.34 |
| | Order of Steps | Only B | A→B | | | | Only B | A→B | | | |
| | Crystal Form of Cellulose | Cell I | | | | | | | | | |

Example 9<Step B: Addition of Isostearyl Glycidyl Ether >

To 1.5 g of Partially Modified Cellulose Fibers 1 was added 1.5 g of a 12% by mass aqueous sodium hydroxide solution, 0.56 equivalents of NaOH per AGU, and homogeneously mixed. Thereafter, 2.9 g of isostearyl glycidyl ether, 1.0 equivalent per AGU, was added thereto as an etherification agent. The system was tightly closed, and the reaction was then carried out by allowing the mixture to stand at 90° C. for 24 hours. After the reaction, the neutralization, the washing, and the vacuum drying were carried out in the same manner as in Production Example 1, to provide modified cellulose fibers.

Examples 10 to 12 and Comparative Example 3<Step B: Addition of Isostearyl Glycidyl Ether >

The same procedures as in Example 9 were carried out except that the amount of isostearyl glycidyl ether was unified at 1.0 equivalent per AGU, and that the partially modified cellulose fibers to be etherified in the step B were changed to those listed in Table 2, to provide each of modified cellulose fibers (Examples 10 to 12) and partially modified cellulose fibers (Comparative Example 3).

Example 13<Step B: Addition of Polyoxyalkylene Alkyl Ether >

To 1.5 g of Partially Modified Cellulose Fibers 1 was added 1.5 g of a 12% by mass aqueous sodium hydroxide solution, 0.56 equivalents of NaOH per AGU, and homogeneously mixed. Thereafter, 7.2 g of the above POA etherification agent, 1.0 equivalent per AGU, was added thereto as an etherification agent. The system was tightly closed, and the reaction was then carried out by allowing the mixture to stand at 70° C. for 24 hours. After the reaction, the neutralization, the washing, and the vacuum drying were carried out in the same manner as in Production Example 1, to provide modified cellulose fibers.

Example 14 and Comparative Example 4<Step B: Addition of Polyoxyalkylene Alkyl Ether>

The same procedures as in Example 13 were carried out except that the amount of the above POA etherification agent was unified at 1.0 equivalent per AGU, and that the partially modified cellulose fibers to be etherified in the step B were changed to those listed in Table 2, to provide each of modified cellulose fibers (Example 14) and partially modified cellulose fibers (Comparative Example 4).

Comparative Example 5<Step B: Addition of Isostearyl Glycidyl Ether in the Presence of Solvent Without Containing Water>

To 5.0 g of Partially Modified Cellulose Fibers 1 were added 3.0 g of N,N-dimethyl-4-aminopyridine (DMAP), 1.1 equivalents per AGU, and 50.0 g of acetonitrile, and homogeneously mixed. Thereafter, 7.2 g of the above isostearyl glycidyl ether, 1.0 equivalent per AGU, was added thereto as an etherification agent. The system was tightly closed, and the reaction was then carried out by allowing the mixture to stand at 70° C. for 24 hours. After the reaction, the reaction mixture was sufficiently washed with toluene and acetone to remove the impurities, and the washed mixture was vacuum-dried overnight at 70° C., to provide modified cellulose fibers.

TABLE 2

| | | Examples | | | | | | | | |
|---|---|---|---|---|---|---|---|---|---|---|
| | | (Comp. Ex. 3) | 9 | 10 | 11 | 12 | (Comp. Ex. 4) | 13 | 14 | (Comp. Ex. 5) |
| Step A | Cellulose Raw Material | — | NBKP | | | | — | NBKP | | |
| | Etherification Agent | — | Propylene oxide | | Butylene oxide | | — | Propylene oxide | | |
| | Formula of Substituent | — | (2) | | | | | (2) | | |
| | Structure of $R_1$ or $R_2$ | — | $—CH_3$ | | $—C_2H_5$ | | — | $—CH_3$ | | |
| | Number of Carbon Atoms of $R_1$ or $R_2$ | — | 1 | | 2 | | — | 1 | | |
| | Solvent | — | Water | | | | — | Water | | |
| | Catalyst | — | NaOH | | | | — | NaOH | | |
| | MSA | — | 0.14 | 0.46 | 0.18 | 0.44 | — | 0.14 | 0.46 | 0.14 |
| Step B | Partially Modified Cellulose Fibers | (NBKP) | 1 | 2 | 3 | 4 | (NBKP) | 1 | 2 | 1 |
| | Etherification Agent | Isostearyl glycidyl ether | | | | | POA Etherification Agent | | | Isostearyl glycidyl ether |
| | Formula of Substituent | (6) | | | | | (6) | | | (6) |
| | Structure of $R_3$ | $—C_{18}H_{37}$ | | | | | $—C_{12}H_{25}$ | | | $—C_{18}H_{37}$ |
| | Number of Carbon Atoms of $R_3$ | 18 | | | | | 12 | | | 18 |
| | A/n | —/— | | | | | EO/13 | | | —/— |
| | Solvent | Water | | | | | | | | Acetonitrile |
| | Catalyst | NaOH | | | | | | | | DMAP |
| | MSB | 0.00 | 0.06 | 0.33 | 0.11 | 0.62 | 0.00 | 0.02 | 0.46 | 0.17 |
| | Order of Steps | Only B | A→B | | | | Only B | A→B | | |
| | Crystal Form of Cellulose | Cell I | | | | | | | | |

Example 15<Step B: Addition of 1-Iodododecane>

To 1.5 g of Partially Modified Cellulose Fibers 3 was added 6.2 g of a 12% by mass aqueous sodium hydroxide solution, 2.0 equivalents of NaOH per AGU, and homogeneously mixed. Thereafter, 2.7 g of 1-iodododecane, 1.0 equivalent per AGU, was added thereto as an etherification agent. The system was tightly closed, and the reaction was then carried out by allowing the mixture to stand at 70° C. for 24 hours. After the reaction, the neutralization, the washing, and the vacuum drying were carried out in the same manner as in Production Example 1, to provide modified cellulose fibers.

Comparative Example 6<Step B: Addition of 1-Iodododecane>

The same procedures as in Example 15 were carried out except that the partially modified cellulose fibers to be etherified in the step B were changed to those listed in Table 3, to provide partially modified cellulose fibers.

Example 16<Step B: Addition of 1-Iodooctadecane>

To 1.5 g of Partially Modified Cellulose Fibers 3 was added 6.2 g of a 12% by mass aqueous sodium hydroxide solution, 2.0 equivalents of NaOH per AGU, and homogeneously mixed. Thereafter, 3.5 g of 1-iodooctadecane, 1.0 equivalent per AGU, was added thereto as an etherification agent. The system was tightly closed, and the reaction was then carried out by allowing the mixture to stand at 70° C. for 24 hours. After the reaction, the neutralization, the washing with each of water, hot isopropanol, and acetone, and the vacuum drying were carried out in the same manner as in Production Example 1, to provide modified cellulose fibers.

Comparative Example 7<Step B: Addition of 1-Iodooctadecane>

The same procedures as in Example 16 were carried out except that the partially modified cellulose fibers to be etherified in the step B were changed to those listed in Table 3, to provide partially modified cellulose fibers.

Example 17<Step B: Addition of 1,2-Epoxydodecane>

To 1.5 g of Partially Modified Cellulose Fibers 3 was added 1.5 g of a 6.4% by mass aqueous sodium hydroxide solution, 0.27 equivalents of NaOH per AGU, and homogeneously mixed. Thereafter, 1.7 g of 1,2-epoxydodecane, 1.0 equivalent per AGU, was added thereto as an etherification agent. The system was tightly closed, and the reaction was then carried out by allowing the mixture to stand at 70° C. for 24 hours. After the reaction, the neutralization, the washing, and the vacuum drying were carried out in the same manner as in Production Example 1, to provide modified cellulose fibers.

Comparative Example 8<Step B: Addition of 1,2-Epoxydodecane>

The same procedures as in Example 17 were carried out except that the partially modified cellulose fibers to be etherified in the step B were changed to those listed in Table 3, to provide partially modified cellulose fibers.

Example 18<Concurrently Step A and Step B>

To 1.5 g of absolutely dried NBKP was added 1.5 g of a 6.4% by mass aqueous sodium hydroxide solution, 0.26 equivalents of NaOH per AGU, and homogeneously mixed. Thereafter, 1.0 g of butylene oxide, 1.5 equivalents per AGU, and 2.2 g of dodecyl glycidyl ether, 1.0 equivalent per AGU, were added thereto as etherification agents. The system was tightly closed, and the reaction was then carried out by allowing the mixture to stand at 50° C. for 4 hours, and then at 70° C. for 20 hours while keeping a tightly closed state. After the reaction, the neutralization, the washing, and the vacuum drying were carried out in the same manner as in Production Example 1, to provide modified cellulose fibers. Here, for the sake of convenience, the sum of the value for MS in the step A and the value for MS in the step B is listed in the row of MSB in Table 3.

TABLE 3

| | | Examples | | | | | | |
|---|---|---|---|---|---|---|---|---|
| | | (Comp. Ex. 6) | 15 | (Comp. Ex. 7) | 16 | (Comp. Ex. 8) | 17 | 18 |
| Step A | Cellulose Raw Material | — | NBKP | — | NBKP | — | NBKP | NBKP |
| | Etherification Agent | — | Butylene oxide | — | Butylene oxide | — | Butylene oxide | |
| | Formula of Substituent | — | (2) | — | (2) | — | (2) | (2) |
| | Structure of $R_1$ or $R_2$ | — | $—C_2H_5$ | — | $—C_2H_5$ | — | $—C_2H_5$ | $—C_2H_5$ |
| | Number of Carbon Atoms of $R_1$ or $R_2$ | — | 2 | — | 2 | — | 2 | 2 |
| | Solvent | — | Water | — | Water | — | Water | Water |
| | Catalyst | — | NaOH | — | NaOH | — | NaOH | NaOH |
| | MSA | — | 0.18 | — | 0.18 | — | 0.18 | 0.26 |
| Step B | Partially Modified Cellulose Fibers | (NBKP) | 3 | (NBKP) | 3 | (NBKP) | 3 | — |
| | Etherification Agent | 1-Iodododecane | | 1-Iodooctadecane | | 1,2-Epoxydodecane | | Dodecyl glycidyl ether |
| | Formula of Substituent | (4) | | (4) | | (5) | | (6) |
| | Structure of $R_3$ | $—C_{12}H_{25}$ | | $—C_{18}H_{37}$ | | $—C_{12}H_{25}$ | | $—C_{12}H_{25}$ |
| | Number of Carbon Atoms of $R_3$ | 12 | | 18 | | 12 | | 12 |
| | A/n | —/— | | —/— | | —/— | | —/— |
| | Solvent | Water | | Water | | Water | | Water |
| | Catalyst | NaOH | | NaOH | | NaOH | | NaOH |
| | MSB | 0.00 | 0.10 | 0.00 | 0.12 | 0.00 | 0.20 | 0.30 |
| | Order of Steps | Only B | A→B | Only B | A→B | Only B | A→B | Concurrently |
| Crystal Form of Cellulose | | Cell I | | | | | | |

Example 19<Addition of Solvent in Step B>

To 1.5 g of Partially Modified Cellulose Fibers 3 was added 1.5 g of a 6.4% by mass aqueous sodium hydroxide solution, 0.27 equivalents of NaOH per AGU, and homogeneously mixed. Thereafter, 1.5 g of isopropyl alcohol (IPA) as an organic solvent and 2.9 g of the above dodecyl glycidyl ether, 1.0 equivalent per AGU, as an etherification agent were added thereto. The system was tightly closed, and the reaction was then carried out by allowing the mixture to stand at 70° C. for 24 hours. After the reaction, the neutralization, the washing, and the vacuum drying were carried out in the same manner as in Production Example 1, to provide modified cellulose fibers.

Comparative Example 9<Addition of Solvent in Step B>

The same procedures as in Example 19 were carried out except that the partially modified cellulose fibers to be etherified in the step B were changed to those listed in Table 4, to provide partially modified cellulose fibers.

Example 20<Addition of Solvent in Step B>

To 1.5 g of Partially Modified Cellulose Fibers 3 was added 1.5 g of a 6.4% by mass aqueous sodium hydroxide solution, 0.27 equivalents of NaOH per AGU, and homogeneously mixed. Thereafter, 3.0 g of isopropyl alcohol (IPA) as an organic solvent and 2.1 g of stearyl glycidyl ether obtained in Production Example C of Etherification Agent, 1.0 equivalent per AGU, as an etherification agent were added thereto. The system was tightly closed, and the reaction was then carried out by allowing the mixture to stand at 70° C. for 24 hours. After the reaction, the neutralization, the washing, and the vacuum drying were carried out in the same manner as in Production Example 1, to provide modified cellulose fibers.

Comparative Example 10<Addition of Solvent in Step B>

The same procedures as in Example 20 were carried out except that the partially modified cellulose fibers to be etherified in the step B were changed to those listed in Table 4, to provide partially modified cellulose fibers.

Example 21<Addition of Solvent in Step B>

To 1.5 g of Partially Modified Cellulose Fibers 3 was added 1.5 g of a 6.4% by mass aqueous sodium hydroxide solution, 0.27 equivalents of NaOH per AGU, and homogeneously mixed. Thereafter, 1.5 g of isopropyl alcohol (IPA) as an organic solvent and 2.1 g of the above isostearyl glycidyl ether, 1.0 equivalent per AGU, as an etherification agent were added thereto. The system was tightly closed, and the reaction was then carried out by allowing the mixture to stand at 70° C. for 24 hours. After the reaction, the neutralization, the washing, and the vacuum drying were carried out in the same manner as in Production Example 1, to provide modified cellulose fibers.

Example 22<Addition of Solvent in Step B>

To 1.5 g of Partially Modified Cellulose Fibers 3 was added 1.5 g of a 6.4% by mass aqueous sodium hydroxide solution, 0.27 equivalents of NaOH per AGU, and homogeneously mixed. Thereafter, 1.5 g of ethanol as an organic solvent and 2.1 g of the above isostearyl glycidyl ether, 1.0 equivalent per AGU, as an etherification agent were added thereto. The system was tightly closed, and the reaction was then carried out by allowing the mixture to stand at 70° C. for 24 hours. After the reaction, the neutralization, the washing, and the vacuum drying were carried out in the same manner as in Production Example 1, to provide modified cellulose fibers.

Comparative Example 11<Addition of Solvent in Step B>

The same procedures as in Example 21 were carried out except that the partially modified cellulose fibers to be etherified in the step B were changed to those listed in Table 4, to provide partially modified cellulose fibers.

TABLE 4

| | | Examples | | | | | | |
|---|---|---|---|---|---|---|---|---|
| | | (Comp. Ex. 9) | 19 | (Comp. Ex. 10) | 20 | (Comp. Ex. 11) | 21 | 22 |
| Step A | Cellulose Raw Material | — | NBKP | — | NBKP | — | NBKP | |
| | Etherification Agent | — | Butylene oxide | — | Butylene oxide | — | Butylene oxide | |
| | Formula of Substituent | — | (2) | — | (2) | | (2) | |
| | Structure of $R_1$ or $R_2$ | — | $—C_2H_5$ | — | $—C_2H_5$ | — | $—C_2H_5$ | |
| | Number of Carbon Atoms of $R_1$ or $R_2$ | — | 2 | — | 2 | — | 2 | |
| | Solvent | — | Water | — | Water | — | Water | |
| | Catalyst | — | NaOH | — | NaOH | — | NaOH | |
| | MSA | — | 0.18 | — | 0.18 | — | 0.18 | |
| Step B | Partially Modified Cellulose Fibers | (NBKP) | 3 | (NBKP) | 3 | (NBKP) | 3 | |
| | Etherification Agent | Dodecyl glycidyl ether | | Stearyl glycidyl ether | | Isostearyl glycidyl ether | | |
| | Formula of Substituent | (6) | | (6) | | (6) | | |
| | Structure of $R_3$ | $—C_{12}H_{25}$ | | $—C_{18}H_{37}$ | | $—C_{18}H_{37}$ | | |
| | Number of Carbon Atoms of $R_3$ | 12 | | 18 | | 18 | | |
| | A/n | —/— | | —/— | | —/— | | |
| | Solvents | Water/IPA | | Water/IPA | | Water/IPA | | Water/ Ethanol |
| | Catalyst | NaOH | | NaOH | | NaOH | | |
| | MSB | 0.00 | 0.35 | 0.00 | 0.09 | 0.00 | 0.10 | 0.11 |
| | Order of Steps | Only B | A→B | Only B | A→B | Only B | A→B | |
| Crystal Form of Cellulose | | | | Cell I | | | | |

Example 23<Addition of Solvent in Step B>

The same procedures as in Example 21 were carried out except that 1.2 g of phenyl glycidyl ether, 1.0 equivalent per AGU, was added in place of 2.1 g of isostearyl glycidyl ether, 1.0 equivalent per AGU, as an etherification agent in the step B, to provide modified cellulose fibers.

Comparative Example 12<Addition of Solvent in Step B>

The same procedures as in Example 23 were carried out except that the partially modified cellulose fibers to be etherified in the step B were changed to those listed in Table 5, to provide partially modified cellulose fibers.

Example 24<Addition of Solvent in Step B>

The same procedures as in Example 21 were carried out except that 1.3 g of o-methylphenyl glycidyl ether, 1.0 equivalent per AGU, was added in place of 2.1 g of isostearyl glycidyl ether, 1.0 equivalent per AGU, as an etherification agent in the step B, to provide modified cellulose fibers.

Comparative Example 13<Addition of Solvent in Step B>

The same procedures as in Example 23 were carried out except that the partially modified cellulose fibers to be etherified in the step B were changed to those listed in Table 5, to provide partially modified cellulose fibers.

butylene oxide, 2.0 equivalents per AGU, was added thereto as an etherification agent. The system was tightly closed, and the reaction was then carried out by allowing the mixture to stand at 50° C. for 8 hours, to provide Partially Modified Cellulose Fibers 7 (MS of butylene oxide: 0.26). After the reaction, to Partially Modified Cellulose Fibers 7 obtained without carrying out neutralization and washing steps was added 3.4 g of dodecyl glycidyl ether, 1.2 equivalents per AGU. The system was tightly closed, and the reaction was then carried out by allowing the mixture to stand at 70° C. for 7 hours. After the reaction, the neutralization, the washing, and the vacuum drying were carried out in the same manner as in Production Example 1, to provide modified cellulose fibers.

Example 26<With Washing Step Between Step A and Step B>

NBKP was used as the cellulose raw materials. First, to 510 g of NBKP was added 502 g of a 6.4% by mass aqueous sodium hydroxide solution, 0.26 equivalents of NaOH per AGU, and homogeneously mixed. Thereafter, 668 g of butylene oxide, 3.0 equivalents per AGU, was added thereto as an etherification agent. The system was tightly closed, and the reaction was then carried out by allowing the mixture to stand at 50° C. for 8 hours. After the reaction, the neutralization, the washing, and the vacuum drying were carried out in the same manner as in Production Example 1, to provide Partially Modified Cellulose Fibers 8 (MS of butylene oxide: 0.23).

To 2.0 g of Partially Modified Cellulose Fibers 8 was added 1.0 g of a 12% by mass aqueous sodium hydroxide

TABLE 5

| | | Examples | | | |
|---|---|---|---|---|---|
| | | (Comp. Ex. 12) | 23 | (Comp. Ex. 13) | 24 |
| Step A | Cellulose Raw Material | — | NBKP | — | NBKP |
| | Etherification Agent | — | Butylene oxide | — | Butylene oxide |
| | Formula of Substituent | — | (2) | — | (2) |
| | Structure of $R_1$ or $R_2$ | — | $—C_2H_5$ | — | $—C_2H_5$ |
| | Number of Carbon Atoms of $R_1$ or $R_2$ | — | 2 | — | 2 |
| | Solvent | — | Water | — | Water |
| | Catalyst | — | NaOH | — | NaOH |
| | MSA | — | 0.30 | — | 0.30 |
| Step B | Partially Modified Cellulose Fibers | (NBKP) | 3 | (NBKP) | 3 |
| | Etherification Agent | Phenyl glycidyl ether | | o-Methylphenyl glycidyl ether | |
| | Formula of Substituent | (6) | | (6) | |
| | Structure of $R_3$ | 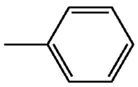 | | 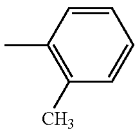 | |
| | Number of Carbon Atoms of $R_3$ | 6 | | 7 | |
| | A/n | —/— | | —/— | |
| | Solvents | Water/IPA | | Water/IPA | |
| | Catalyst | NaOH | | NaOH | |
| | MSB | 0.10 | 0.16 | 0.08 | 0.15 |
| | Order of Steps | Only B | A→B | Only B | A→B |
| | Crystal Form of Cellulose | Cell I | | | |

Example 25<Without Washing Step Between Step A and Step B>NBKP was used as the cellulose raw materials. First, to 2.0 g of NBKP was added 0.8 g of a 14% by mass aqueous sodium hydroxide solution, 0.26 equivalents of NaOH per AGU, and homogeneously mixed. Thereafter, 1.6 g of solution, 0.26 equivalents of NaOH per AGU, and homogeneously mixed. Thereafter, 3.2 g of dodecyl glycidyl ether, 1.2 equivalents per AGU, was added thereto. The system was tightly closed, and the reaction was then carried out by allowing the mixture to stand at 70° C. for 7 hours. After the reaction, the neutralization, the washing, and the vacuum drying were carried out in the same manner as in Production Example 1, to provide modified cellulose fibers.

The conditions and the results and the like of the above Examples are shown in Table 6.

TABLE 6

| | | Examples | |
|---|---|---|---|
| | | 25 | 26 |
| step A | Cellulose Raw Material | NBKP | |
| | Etherification Agent | Butylene oxide | |
| | Formula of Substituent | -2 | |
| | Structure of $R_1$ or $R_2$ | $—C_2H_5$ | |
| | Number of Carbon Atoms of $R_1$ or $R_2$ | 2 | |
| | Solvent | Water | |
| | Catalyst | NaOH | |
| | MSA | 0.26 | 0.23 |
| step B | Partially Modified Cellulose Fibers | 7 | 8 |
| | Etherification Agent | Dodecyl glycidyl ether | |
| | Formula of Substituent | -6 | |
| | Structure of $R_3$ | $—C_{12}H_{25}$ | |
| | Number of Carbon Atoms of $R_3$ | 12 | |
| | A/n | -/- | |
| | Solvent | Water | |
| | Catalyst | NaOH | |
| | MSB | 0.18 | 0.03 |
| With or Without Washing Between Step A and Step B | | Without | With |
| Order of Steps | | A→B | |
| Crystal Form of Cellulose | | Cell I | |

As shown in the above Examples, according to the method for production of the present invention, since a solvent containing water can be used as a solvent during the etherification reaction, the reduction in production costs can be accomplished. In the estimate, the equipment costs can be lowered to ¼ or so by not necessitating specialized facilities such as anti-explosion facilities or harm-removing facilities. In addition, although the MS of the modified cellulose fibers obtained in Examples of the present invention, specifically the sum of MSA and MSB, of 0.02 or more are exemplified as Examples, it is confirmed to be highly excellent in Examples in the points that this value is a sufficient value for the purpose of hydrophobicizing the fiber surface, and that it is possible to improve hydrophobicity to a given level of MS by the amount of a substituent to be optionally introduced or a structure in the step A, and an increased amount of the etherification agent used, or the like (For example, comparisons between Example 1 with Examples 2, 5, and 6, and the like).

On the other hand, as shown in Comparative Examples 1 to 4, and 6 to 11, an etherification agent having a relatively long carbon chain is first tried to be introduced using a solvent containing water. However, it could be seen that the introduction of the substituent cannot be achieved at all, as can be seen from the matter that all the MS's of the partially modified cellulose fibers obtained are nearly 0.

Although the modified cellulose fibers having the same level of MS as in Examples were obtained even in Comparative Example 5, the method for production involves the use of a conventional solvent without containing water or the use of an organic base, which has some disadvantages in costs in the aspect of facilities and in the aspect of production processes.

In addition, it could be seen from the comparisons of Examples 25 and 26 that surprisingly, the introduction ratio in the step B can be increased when the method does not have a washing step between the step A and the step B.

Production Example 2-1 of Partially Modified Cellulose Fibers <Step A: Addition of Propylene Oxide to Cellulose>

NBKP was used as the cellulose raw materials. First, to 1.5 g of absolutely dried NBKP was added 1.5 g of a 6.4% by mass aqueous sodium hydroxide solution, 0.26 equivalents of NaOH per AGU, and homogeneously mixed. Thereafter, 0.65 g of propylene oxide, 1.2 equivalents per AGU, was added thereto as an etherification agent. The system was tightly closed, and the reaction was then carried out by allowing the mixture to stand at 50° C. for 2 hours. After the reaction, the reaction mixture was neutralized with acetic acid, and sufficiently washed with water and acetone, respectively, to remove impurities, and the washed mixture was vacuum-dried overnight at 70° C., to provide Partially Modified Cellulose Fibers 2-1 (MS of propylene oxide: 0.14).

Production Example 2-2 of Partially Modified Cellulose Fibers <Step A: Addition of Butylene Oxide to Cellulose>

According to Production Example 2-1, Partially Modified Cellulose Fibers 2-2 (MS of butylene oxide: 0.18) were obtained, with following the conditions defined in Table 2-A.

Production Example 2-3 of Partially Modified Cellulose Fibers <Step A: Addition of Allyl Glycidyl Ether to Cellulose>

According to Production Example 2-1, Partially Modified Cellulose Fibers 2-3 (MS of allyl glycidyl ether: 0.19) were obtained, with following the conditions defined in Table 2-A.

Production Example 2-4 of Partially Modified Cellulose Fibers <Step A: Addition of Ethyl Group to Cellulose>

According to Production Example 2-1, Partially Modified Cellulose Fibers 2-4 (MS of ethyl group: 0.36) were obtained, with following the conditions defined in Table 2-A.

TABLE 2-A

| | | Production Examples | | | |
|---|---|---|---|---|---|
| | | 2-1 | 2-2 | 2-3 | 2-4 |
| Aqueous NaOH Solution | Concentration, % by mass | 6.4 | | | 12 |
| | Amount, g | 1.5 | | | 6.2 |
| | Equivalents/AGU | 0.26 | | | 2.0 |
| Etherification Agent | Kinds | Propylene oxide | Butylene oxide | Allyl glycidyl ether | Iodoethane |
| | Amount, g | 0.65 | 1.0 | 3.2 | 2.2 |
| | Equivalents/AGU | 1.2 | 1.5 | 3.0 | 1.5 |
| Conditions for | Temperature, ° C. | 50 | | 70 | |

TABLE 2-A-continued

| | | Production Examples | | | |
|---|---|---|---|---|---|
| | | 2-1 | 2-2 | 2-3 | 2-4 |
| reaction while allowing to stand | Time, h | 2 | 4 | 24 | |

Example 2-1<Step B: Addition of 2-Ethylhexyl Glycidyl Ether>

To 1.5 g of Partially Modified Cellulose Fibers 2-1 was added 1.5 g of a 12% by mass aqueous sodium hydroxide solution, 0.56 equivalents of NaOH per AGU, and homogeneously mixed. Thereafter, 3.2 g of 2-ethylhexyl glycidyl ether, 2.0 equivalents per AGU, was added thereto as an etherification agent. The system was tightly closed, and the reaction was then carried out by allowing the mixture to stand at 70° C. for 24 hours.

After the reaction, the neutralization, the washing, and the vacuum drying were carried out in the same manner as in Production Example 2-1, to provide modified cellulose fibers.

Example 2-2<Step B: Addition of 2-Ethylhexyl Glycidyl Ether >

The same procedures as in Example 2-1 were carried out except that the partially modified cellulose fibers to be etherified in the step B were changed to those listed in Table 2-1, to provide modified cellulose fibers.

Comparative Example 2-1 and Comparative Example 2-2<Step B: Addition of 2-Ethylhexyl Glycidyl Ether>

The same procedures were carried out as in Example 2-1 for Comparative Example 2-1, or as in Example 2-2 for Comparative Example 2-2, except that a solvent used was changed to 9.0 g of acetonitrile in place of the aqueous sodium hydroxide solution, and that the catalyst was changed to 1.8 g of N,N-dimethyl-4-aminopyridine (DMAP), 1.6 equivalents per AGU, to provide each of modified cellulose fibers.

Example 2-3<Step B: Addition of Dodecyl Glycidyl Ether>

To 1.5 g of Partially Modified Cellulose Fibers 2-1 was added 1.5 g of a 6.4% by mass aqueous sodium hydroxide solution, 0.27 equivalents of NaOH per AGU, and homogeneously mixed. Thereafter, 4.2 g of dodecyl glycidyl ether, 2.0 equivalents per AGU, was added thereto as an etherification agent. The system was tightly closed, and the reaction was then carried out by allowing the mixture to stand at 70° C. for 24 hours. After the reaction, the neutralization, the washing, and the vacuum drying were carried out in the same manner as in Production Example 2-1, to provide modified cellulose fibers.

Examples 2-4 to 2-6<Step B: Addition of Dodecyl Glycidyl Ether>

The same procedures as in Example 2-3 were carried out except that the amount of dodecyl glycidyl ether was changed to 1.0 equivalent per AGU, and that the partially modified cellulose fibers to be etherified in the step B were changed to those listed in Table 2-1, to provide each of modified cellulose fibers.

Comparative Example 2-3<Step B: Addition of Dodecyl Glycidyl Ether>

The same procedures as in Example 2-3 were carried out except that the aqueous sodium hydroxide solution was changed to 9.0 g of acetonitrile, and that the catalyst was changed to 1.8 g of N,N-dimethyl-4-aminopyridine (DMAP), 1.6 equivalents per AGU, to provide modified cellulose fibers.

Example 2-7<Step B: Addition of Isostearyl Glycidyl Ether >

To 1.5 g of Partially Modified Cellulose Fibers 2-2 was added 1.5 g of a 6.4% by mass aqueous sodium hydroxide solution, 0.27 equivalents of NaOH per AGU, and homogeneously mixed. Thereafter, 1.5 g of isopropyl alcohol as an organic solvent and 8.7 g of the above isostearyl glycidyl ether, 3.0 equivalents per AGU, as an etherification agent were added thereto. The system was tightly closed, and the reaction was then carried out by allowing the mixture to stand at 70° C. for 24 hours. After the reaction, the neutralization, the washing, and the vacuum drying were carried out in the same manner as in Production Example 2-1, to provide modified cellulose fibers.

Comparative Example 2-4<Step B: Addition of Isostearyl Glycidyl Ether>

The same procedures as in Example 2-7 were carried out except that the aqueous sodium hydroxide solution was changed to 9.0 g of acetonitrile, that the catalyst was changed to 1.8 g of N,N-dimethyl-4-aminopyridine (DMAP), 1.6 equivalents per AGU, and that isopropyl alcohol was not used, to provide modified cellulose fibers.

Example 2-8<Step B: Addition of Stearyl Glycidyl Ether>

The same procedures as in Example 2-7 were carried out except that the etherification agent used was changed to one listed in Table 2-2, and that after the reaction, the neutralization and the washing with each of water, hot isopropanol, and acetone were carried out in the same manner as in Production Example 2-1, to provide modified cellulose fibers.

Example 2-9<Step B: Addition of Polyoxyalkylene Alkyl Ether>

To 1.5 g of Partially Modified Cellulose Fibers 2-2 was added 1.5 g of a 12% by mass aqueous sodium hydroxide solution, 0.56 equivalents of NaOH per AGU, and homogeneously mixed. Thereafter, 7.2 g of the above POA etherification agent, 1.0 equivalent per AGU, was added thereto as an etherification agent. The system was tightly closed, and the reaction was then carried out by allowing the mixture to stand at 70° C. for 24 hours. After the reaction, the neutralization, the washing, and the vacuum drying were carried out in the same manner as in Production Example 2-1, to provide modified cellulose fibers.

Comparative Example 2-5 and Comparative Example 2-6<Step B: Addition of Stearyl Glycidyl Ether or Polyoxyalkylene Alkyl Ether>

The same procedures were carried out as in Example 2-8 for Comparative Example 2-5, or as in Example 2-9 for Comparative Example 2-6, except that the aqueous sodium hydroxide solution was changed to 9.0 g of acetonitrile, and that the catalyst was changed to 1.8 g of N,N-dimethyl-4-aminopyridine (DMAP), 1.6 equivalents per AGU, to provide each of modified cellulose fibers.

Example 2-10<Step B: Addition of 1-Iodododecane>

To 1.5 g of Partially Modified Cellulose Fibers 2-2 was added 6.2 g of a 12% by mass aqueous sodium hydroxide solution, 2.0 equivalents of NaOH per AGU, and homogeneously mixed. Thereafter, 2.7 g of 1-iodododecane, 1.0 equivalent per AGU, was added thereto as an etherification agent. The system was tightly closed, and the reaction was then carried out by allowing the mixture to stand at 70° C. for 24 hours. After the reaction, the neutralization, the washing, and the vacuum drying were carried out in the same manner as in Production Example 2-1, to provide modified cellulose fibers.

Example 2-11<Step B: Addition of 1-Iodooctadecane>

To 1.5 g of Partially Modified Cellulose Fibers 2-2 was added 6.2 g of a 12% by mass aqueous sodium hydroxide solution, 2.0 equivalents of NaOH per AGU, and homogeneously mixed. Thereafter, 3.5 g of 1-iodooctadecane, 1.0 equivalent per AGU, was added thereto as an etherification agent. The system was tightly closed, and the reaction was then carried out by allowing the mixture to stand at 70° C. for 24 hours. After the reaction, the neutralization, the washing with each of water, hot isopropanol, and acetone, and the vacuum drying were carried out in the same manner as in Production Example 2-1, to provide modified cellulose fibers.

Comparative Example 2-7 and Comparative Example 2-8<Step B: Addition of 1-Iodododecane or 1-Iodooctadecane>

The same procedures were carried out as in Example 2-10 for Comparative Example 2-7, or as in Example 2-11 for Comparative Example 2-8, except that the aqueous sodium hydroxide solution was changed to 9.0 g of acetonitrile, and that the catalyst was changed to 0.7 g of powdery NaOH (DMAP), 2.0 equivalents per AGU, to provide each of modified cellulose fibers.

Example 2-12<Step B: Addition of 1,2-Epoxydodecane>

To 1.5 g of Partially Modified Cellulose Fibers 2-2 was added 1.5 g of a 6.4% by mass aqueous sodium hydroxide solution, 0.27 equivalents of NaOH per AGU, and homogeneously mixed. Thereafter, 1.7 g of 1,2-epoxydodecane, 1.0 equivalent per AGU, was added thereto as an etherification agent. The system was tightly closed, and the reaction was then carried out by allowing the mixture to stand at 70° C. for 24 hours. After the reaction, the neutralization, the washing, and the vacuum drying were carried out in the same manner as in Production Example 2-1, to provide modified cellulose fibers.

Comparative Example 2-9<Step B: Addition of 1,2-Epoxydodecane>

The same procedures were carried out as in Example 2-12 except that the aqueous sodium hydroxide solution was changed to 9.0 g of acetonitrile, and that the catalyst was changed to 1.8 g of N,N-dimethyl-4-aminopyridine (DMAP), 1.6 equivalents per AGU, to provide modified cellulose fibers.

The results and the like of each of Examples and Comparative Examples mentioned above are summarized in the following tables.

TABLE 2-1

| | | Examples | | | | | | | | |
|---|---|---|---|---|---|---|---|---|---|---|
| | | (Comp. Ex. 2-1) | 2-1 | (Comp. Ex. 2-2) | 2-2 | (Comp. Ex. 2-3) | 2-3 | 2-4 | 2-5 | 2-6 |
| Step A | Cellulose Raw Material | NBKP | | | | | | | | |
| | Etherification Agent | Propylene oxide | | Butylene oxide | | Propylene oxide | | Butylene oxide | Ally1 glycidyl ether | Iodo-ethane |
| | Formula of Substituent | (2) | | | | (2) | | | (3) | (1) |
| | Structure of $R_1$ or $R_2$ | $—CH_3$ | | $—C_2H_5$ | | $—CH_3$ | | $—C_2H_5$ | $—CH_2CHCH_2$ | $—C_2H_5$ |
| | Number of Carbon Atoms of $R_1$ or $R_2$ | 1 | | 2 | | 1 | | 2 | 3 | 2 |
| | MSA | 0.14 | | 0.18 | | 0.14 | | 0.18 | 0.19 | 0.36 |
| Step B | Partially Modified Cellulose Fibers | 2-1 | | 2-2 | | 2-1 | | 2-2 | 2-3 | 2-4 |
| | Etherification Agent | 2-Ethylhexyl glycidyl ether | | | | Dodecyl glycidyl ether | | | | |
| | Formula of Substituent | (6) | | | | | | | | |
| | Structure of $R_3$ | $—C_{18}H_{37}$ | | | | $—C_{12}H_{25}$ | | | | |
| | Number of Carbon Atoms of $R_3$ | 8 | | | | 12 | | | | |
| | A/n | —/— | | | | | | | | |
| | MSB | 0.17 | 0.19 | 0.18 | 0.18 | 0.22 | 0.20 | 0.22 | 0.14 | 0.34 |
| Crystal Form of Cellulose | | Cell I | | | | | | | | |
| Ratio of Peak Areas | | 0.11 | 0.38 | 0.06 | 0.96 | 0.13 | 0.50 | 0.55 | 0.48 | 0.56 |

TABLE 2-1-continued

| | Examples | | | | | | | | |
|---|---|---|---|---|---|---|---|---|---|
| | (Comp. Ex. 2-1) | 2-1 | (Comp. Ex. 2-2) | 2-2 | (Comp. Ex. 2-3) | 2-3 | 2-4 | 2-5 | 2-6 |
| Ratio of Peak Heights | 0.15 | 0.36 | 0.11 | 0.84 | 0.13 | 0.42 | 0.35 | 0.62 | 0.81 |
| Double Refraction | C | A | C | A | C | A | A | A | A |
| Viscosity of 0.5% Dispersion, mPa · s | 2679 | 73 | 2880 | 65 | 887 | 51 | 50 | 35 | 52 |

TABLE 2-2

| | | Examples | | | | | |
|---|---|---|---|---|---|---|---|
| | | (Comp. Ex. 2-4) | 2-7 | (Comp. Ex. 2-5) | 2-8 | (Comp. Ex. 2-6) | 2-9 |
| Step A | Cellulose Raw Material | NBKP | | | | | |
| | Etherification Agent | Butylene oxide | | | | | |
| | Formula of Substituent | (2) | | | | | |
| | Structure of $R_1$ or $R_2$ | $—C_2H_5$ | | | | | |
| | Number of Carbon Atoms of $R_1$ or $R_2$ | 2 | | | | | |
| | MSA | 0.18 | | | | | |
| Step B | Partially Modified Cellulose Fibers | 2-2 | | | | | |
| | Etherification Agent | Isostearyl glycidyl ether | | Stearyl glycidyl ether | | POA etherification agent | |
| | Formula of Substituent | (6) | | (6) | | (6) | |
| | Structure of $R_3$ | $—C_{18}H_{37}$ | | $—C_{18}H_{37}$ | | $—C_{12}H_{25}$ | |
| | Number of Carbon Atoms of $R_3$ | 18 | | 18 | | 12 | |
| | A/n | —/— | | —/— | | EO/13 | |
| | MSB | 0.18 | 0.11 | 0.27 | 0.25 | 0.02 | 0.02 |
| | Crystal Form of Cellulose | Cell I | | | | | |
| | Ratio of Peak Areas | 0.17 | 0.39 | 0.11 | 0.39 | 0.15 | 0.42 |
| | Ratio of Peak Heights | 0.10 | 0.41 | 0.09 | 0.32 | 0.16 | 0.49 |
| | Double Refraction | C | A | C | A | C | A |
| | Viscosity of 0.5% Dispersion, mPa · s | 7950 | 51 | 4785 | 42 | 6336 | 60 |

TABLE 2-3

| | | Examples | | | | | |
|---|---|---|---|---|---|---|---|
| | | (Comp. Ex. 2-7) | 2-10 | (Comp. Ex. 2-8) | 2-11 | (Comp. Ex. 2-9) | 2-12 |
| Step A | Cellulose Raw Material | NBKP | | | | | |
| | Etherification Agent | Butylene oxide | | | | | |
| | Formula of Substituent | (2) | | | | | |
| | Structure of $R_1$ or $R_2$ | $—C_2H_5$ | | | | | |
| | Number of Carbon Atoms of $R_1$ or $R_2$ | 2 | | | | | |
| | MSA | 0.18 | | | | | |
| Step B | Partially Modified Cellulose Fibers | 2-2 | | | | | |
| | Etherification Agent | 1-Iodo-dodecane | | 1-Iodo-octadecane | | 1,2-Epoxy-dodecane | |
| | Formula of Substituent | (4) | | (4) | | (5) | |
| | Structure of $R_3$ | $—C_{12}H_{25}$ | | $—C_{18}H_{37}$ | | $—C_{12}H_{25}$ | |
| | Number of Carbon Atoms of $R_3$ | 12 | | 18 | | 12 | |
| | A/n | —/— | | —/— | | —/— | |
| | MSB | 0.13 | 0.10 | 0.10 | 0.12 | 0.19 | 0.20 |
| | Crystal Form of Cellulose | Cell I | | | | | |
| | Ratio of Peak Areas | 0.09 | 0.52 | 0.14 | 0.44 | 0.09 | 0.56 |
| | Ratio of Peak Heights | 0.05 | 0.47 | 0.17 | 0.34 | 0.14 | 0.30 |

TABLE 2-3-continued

| | Examples | | | | | |
|---|---|---|---|---|---|---|
| | (Comp. Ex. 2-7) | 2-10 | (Comp. Ex. 2-8) | 2-11 | (Comp. Ex. 2-9) | 2-12 |
| Double Refraction | C | A | C | A | C | A |
| Viscosity of 0.5% Dispersion, mPa · s | 5070 | 62 | 7281 | 58 | 7019 | 53 |

The details of the main components used in the above Production Examples, Examples, and Comparative Examples are as follows. Polyoxyethylene (13)-n-alkyl (C12) ether, manufactured by Kao Corporation, under the trade name of EMULGEN 120, alkyl chain length: n-C12, a molar degree of polymerization of oxyethylene group on average: 13);

Allyl glycidyl ether, manufactured by Tokyo Chemical Industry Co., Ltd., under the trade name of Allyl Glycidyl Ether;

2-Ethylhexyl glycidyl ether, manufactured by Tokyo Chemical Industry Co., Ltd., under the trade name of 2-Ethylhexyl Glycidyl Ether;

Dodecyl glycidyl ether, manufactured by Tokyo Chemical Industry Co., Ltd., under the trade name of Glycidyl Lauryl Ether;

Phenyl glycidyl ether, manufactured by Tokyo Chemical Industry Co., Ltd., under the trade name of Glycidyl Phenyl Ether; and o-Methylphenyl glycidyl ether, manufactured by Sigma-Aldrich, under the trade name of Glycidyl 2-methylphenyl ether As shown in the above Examples, the viscosity of the dispersion of modified cellulose fibers could be remarkably reduced, while keeping favorable dispersibility, by using modified cellulose fibers having diffraction peaks at 2θ=18-21° in the X-ray diffraction analyses disclosed in the present invention. This shows that the dispersion of modified cellulose fibers itself shows remarkably improved handing property, and at the same time the production loads can be significantly reduced when the modified cellulose fibers are subjected to a dispersion treatment in a hydrophobic solvent such a resin. On the other hand, as shown in Comparative Examples 2-1 to 2-9, it could be confirmed that the increase in viscosities of the dispersion using modified cellulose fibers without having diffraction peaks at 2θ=18-21° in the X-ray diffraction analyses is remarkable, thereby making them disadvantageous in handling property.

INDUSTRIAL APPLICABILITY

The cellulose fibers of the present invention have favorable dispersibility in a hydrophobic medium and controlled increase in viscosity. In addition, since the molded article obtained by forming a composite of modified cellulose fibers obtained by the method for production of the present invention with a resin has both high mechanical strength and toughness, the molded article can be suitably used in various industrial applications such as daily sundries, household electric appliance parts, packaging materials for household electric appliances, automobile parts, transparent resin materials, materials for three-dimensional modeling, cushioning materials, repairing materials, adhesives, bonding agents, sealing materials, heat insulation materials, sound absorbing materials, artificial leather materials, paints, electronic materials, wrapping materials, tires, and fibrous composite materials.

The invention claimed is:

1. A method for producing modified cellulose fibers having cellulose I crystal structure, comprising:

step A: introducing at least one of propylene oxide, butylene oxide, allyl glycidyl ether, and iodoethane to cellulose fibers via an ether bond in a solvent comprising water in the presence of a base wherein the proportion which is occupied by water in the solvent comprising water is 99% by mass or more; and step B: introducing at least one of 2-ethylhexyl glycidyl ether, dodecyl glycidyl ether, isostearyl glycidyl ether,

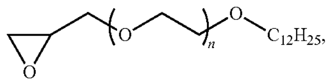

1-iodododecane, 1,2-epoxydodecane, stearyl glycidyl ether, and 1-iodooctadecane to cellulose fibers via an ether bond in a solvent comprising water in the presence of a base, wherein the cellulose raw materials are subjected to the step A and the step B in the order of the step A and then the step B and wherein step A and step B are performed at a temperature of 40° C. to 90° C. for a period of 10 hours to 36 hours.

2. The method for production according to claim 1, wherein the solvent comprising water in the step A is water, or a mixture comprising water and one or more solvents selected from the group consisting of ethanol, isopropanol, t-butanol, ethylene glycol, propylene glycol, 1,2-butanediol, 1,3-butanediol, N-methylpyrrolidone, dimethyl formamide, dimethyl sulfoxide, dimethyl acetamide, 1,3-dimethyl-2-imidazolidinone, acetone, methyl ethyl ketone, methyl isobutyl ketone, tetrahydrofuran, and 1,4-dioxane.

3. The method for production according to claim 1, wherein the solvent comprising water in the step B is water, or a mixture comprising water and one or more solvents selected from the group consisting of ethanol, isopropanol, t-butanol, ethylene glycol, propylene glycol, 1,2-butanediol, 1,3-butanediol, N-methylpyrrolidone, dimethyl formamide, dimethyl sulfoxide, dimethyl acetamide, 1,3-dimethyl-2-imidazolidinone, acetone, methyl ethyl ketone, methyl isobutyl ketone, tetrahydrofuran, and 1,4-dioxane.

4. The method for production according to claim 1, wherein a washing treatment step is not carried out between the step A and the step B.

5. The method for production according to claim 1, wherein the solvent comprising water in the step B comprises water in an amount of 3% by mass or more.

* * * * *